(12) United States Patent
Cheng et al.

(10) Patent No.: US 12,250,330 B2
(45) Date of Patent: Mar. 11, 2025

(54) METHOD AND SERVER FOR PERFORMING BUILDING INFORMATION MODELLING DESIGN COLLABORATION VIA CONFIDENTIALITY-MINDED FRAMEWORK USING INTERPLANETARY-FILE-SYSTEM-BLOCKCHAIN INTEGRATED NETWORK

(71) Applicant: The Hong Kong University of Science and Technology, Hong Kong (CN)

(72) Inventors: Jack Chin Pang Cheng, Hong Kong (CN); Xingyu Tao, Hong Kong (CN); Yuhan Liu, Hong Kong (CN); Moumita Das, Hong Kong (CN); Kok Yiu Wong, Hong Kong (CN); Keyu Chen, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 333 days.

(21) Appl. No.: 18/149,673

(22) Filed: Jan. 4, 2023

(65) Prior Publication Data
US 2023/0239166 A1 Jul. 27, 2023

Related U.S. Application Data

(60) Provisional application No. 63/303,041, filed on Jan. 26, 2022.

(51) Int. Cl.
*H04L 9/00* (2022.01)
*G06F 21/62* (2013.01)
(Continued)

(52) U.S. Cl.
CPC .......... *H04L 9/50* (2022.05); *G06F 21/6218* (2013.01); *G06F 30/13* (2020.01); *G06F 2111/02* (2020.01)

(58) Field of Classification Search
CPC ..... H04L 9/50; H04L 9/3218; G06F 21/6218; G06F 2111/02; G06F 30/13
See application file for complete search history.

(56) References Cited

U.S. PATENT DOCUMENTS

2020/0394321 A1* 12/2020 Ramos .................. G06F 16/93
2024/0330857 A1* 10/2024 Srinivasan ........... G06Q 10/103

OTHER PUBLICATIONS

Fan Xue et al., "A semantic differential transaction approach to minimizing information redundancy for BIM and blockchain integration," Automation in Construction, 2020, vol. 118, 103270, pp. 1-13.

(Continued)

*Primary Examiner* — Olugbenga O Idowu
(74) *Attorney, Agent, or Firm* — Idea Intellectual Limited; Margaret A. Burke; Sam T. Yip

(57) ABSTRACT

A method for performing Building Information Modelling design collaboration via Confidentiality-Minded Framework using Interplanetary-File-System-Blockchain integrated network by a server is provided. The method includes: segregating one or more sensitive and non-sensitive BIM portions of a BIM object; uploading a target BIM component into an IPFS network to receive a target content identifier (CID) of the target BIM component from the IPFS network; if the target BIM component has one or more of the sensitive portions, encrypting the target CID to obtain a target encrypted CID (ECID), and adding the target ECID into a target blockchain ledger as a target transaction via a target smart contract; accessing the target transaction to download the target BIM component from the IPFS network; and performing a design coordination operation on the target BIM component, so as to distributing revised target BIM component to a receiver terminal.

12 Claims, 27 Drawing Sheets

(51) Int. Cl.
    *G06F 30/13*     (2020.01)
    *G06F 111/02*     (2020.01)

(56) References Cited

OTHER PUBLICATIONS

Zhen Liu et al., "Building Information Management (BIM) and Blockchain (BC) for Sustainable Building Design Information Management Framework," Electronics, 2019, vol. 8, 724, pp. 1-15.
Alan J. McNamara et al., "Intelligent contract adoption in the construction industry: Concept development," Automation in Construction, 2021, vol. 122, 103452, pp. 1-20.
May Winfield et al., "The Winfield Rock Report Overcoming the Legal and Contractual Barriers of BIM," UK BIM Alliance, 2018, pp. 1-60.
Hugh Boyes, "Resilience and Cyber Security of Technology in the Built Environment," IET Standards Technical Briefing, 2013, pp. 1-58.
Rongyue Zheng et al., "bcBIM: A Blockchain-Based Big Date Model for BIM Modification Audit and Provenance in Mobile Cloud," Mathematical Problems in Engineering, 2019, vol. 5349538, pp. 1-13.
Xiao Li et al., "Two-layer Adaptive Blockchain-based Supervision model for off-site modular housing production," Computers in Industry, 2012, vol. 128, 103437, pp. 1-15.

\* cited by examiner (a) Workflow of coordination on sensitive BIM components

METHOD AND SERVER FOR PERFORMING BUILDING INFORMATION MODELLING DESIGN COLLABORATION VIA CONFIDENTIALITY-MINDED FRAMEWORK USING INTERPLANETARY-FILE-SYSTEM-BLOCKCHAIN INTEGRATED NETWORK

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to techniques for performing Building Information Modelling (BIM) design collaboration via confidentiality-minded Framework (CMF) using Interplanetary-File-System (IPFS)-Blockchain integrated network.

BACKGROUND OF THE INVENTION

Design collaboration in the architecture, engineering, and construction (AEC) industry is a complicated and iterative process, involving multidisciplinary designers and continuous data exchange. Building Information Modeling (BIM) technology represents a paradigm shift in data management. Supported by a shared BIM model, designers can electronically share design attributes and tackle design issues in real-time, thereby facilitating the overall decision-making process, streamlining collaboration, and enhancing product quality. However, the existing development of BIM-based design platforms is mainly based on centralized system architecture. These platforms, therefore, have cybersecurity risks, especially vulnerability toward data manipulation. Since the central database is the only data source of BIM, a malicious insider attempting to exonerate him/her from liability issues can unwittingly tamper with design records and files. As a result, the project team may lose the traceability and authenticity of the BIM data. A third-party vendor or a project member having complete authority/control over a platform may also pose a high risk of single-point failure or denial of access, resulting in project delay, data loss, and even additional costs.

Blockchain technology is an emerging and promising solution to prevent the data manipulation problem caused by centralization. Blockchain is a distributed database technology that guarantees data traceability, authenticity, and immutability by integrating peer-to-peer networks, consensus mechanisms, and hash functions. Without an intermediary or central authority, data in a blockchain are maintained collectively, and every peer locally holds a complete copy of the data (i.e., blockchain ledger). A recent wave of research has presented the feasibility of integrating BIM with blockchain. For example, Xue et al. [F. Xue, W. Lu, *A semantic differential transaction approach to minimizing information redundancy for BIM and blockchain integration*, Automation in Construction, 118, (2020), p. 103270] captured semantic changes of BIM models and stored them in a blockchain to trace the design changes. Liu et al. [Z. Liu, L. Jiang, M. Osmani, P. J. E. Demian, *Building information management (BIM) and blockchain (BC) for sustainable building design information management framework*, Electronics, 8, (7), (2019), p. 724] proposed a sustainable building design framework utilizing blockchain and BIM; the result showed that blockchain formed a trustworthy environment and increased the designers' confidence in joining the collaboration. Coupling blockchain with smart contracts could automatically distribute design data, reducing the time needed to issue permits during the design process [A. J. McNamara, S. M. E. Sepasgozar, *Intelligent contract adoption in the construction industry: Concept development*, Automation in Construction, 122, (2021), p. 103452]. The Winfield-Rock Report [M. Winfield, *The winfield rock report: Overcoming the legal and contractual barriers of BIM*, UK BIM Alliance, 2018, Last accessed on, pp. 1-60] concluded that BIM collaborations would benefit from a decentralized mechanism, like blockchain, which securely records data flow and traces liabilities among peers.

However, integrating BIM with blockchain faces the challenge of leaking sensitive data, due to the lack of access control methods. Blockchain is a transparent network where every peer (or project member) may access all design data in the blockchain ledger locally without limitations, hence posing a high risk of unauthorized access to sensitive BIM data. According to the latest ISO 19650-5: 2020 standard, confidential or sensitive BIM data refer to the loss or modification of, or unauthorized access to, which would adversely affect individual privacy, compromise intellectual properties, and trade secrets of an organization, cause commercial or economic harm and even jeopardize nation security. BIM models, especially that some of the critical infrastructures (e.g., banks, prisons, and military assets) or commercial buildings, often contain a large amount of confidential information (as shown in Appendix table), including but not limited to (1) sensitive zone layouts in architecture models, (2) patented steel reinforcement ratio of core-tube structures in structure models and (3) design details of an electrical power system in MEP (mechanical, electrical, and plumbing) models. In a design process, such sensitive information must be kept confidential and should not be disclosed to all participants. Developing strategies to control unauthorized access to confidential BIM data has been highlighted as the primary task in design collaboration, according to the ISO 19650-5: 2020.

Nevertheless, limited research efforts have been devoted to protecting BIM confidentiality in a transparent blockchain, resulting in a high risk of leaking sensitive data, given that peers have uncontrolled authority to access their local blockchain ledger. Boyes et al. [H. Boyes, *Resilience and cyber security of technology in the built environment*, Institution of Engineering and Technology, 2013, Last accessed on 21 Jul. 2021] pointed out that the absence of access control in blockchain would undermine intellectual properties and even jeopardize the security of sensitive infrastructures, such as banks, courts, and prisons. Traditional access control solutions (e.g., lock-based protocols or multilevel relational models) for centralized databases cannot be directly applied in blockchain because blockchain has a chained data model and decentralized database architecture. These approaches used in relational or E-R models (in centralized databases) are not suitable for chained data models (in the blockchain). Besides, these approaches are ineffective in managing access to distributed (or multiple) databases synchronously. Zheng et al. [R. Zheng, J. Jiang, X. Hao, W. Ren, F. Xiong, Y. Ren, bcBIM: *A bockchain-based big data model for BIM modification audit and provenance in mobile cloud*, Mathematical Problems in Engineering, (2019), p. 5349538] designed a "bcBIM" system where project members shared hash values of BIM models in the blockchain. Although this approach prevented data disclosure, it only provided data proofs (i.e., hash values), and members could not get any source design data (e.g., BIM models) from or through the blockchain. Li et al. [X. Li, L. Wu, R. Zhao, W. Lu, F. Xue, *Two-layer adaptive blockchain-based supervision model for off-site modular housing production*, Computers in Industry, 128, (2021), p. 103437] attempted to protect sensitive project data by putting them in a "sidechain" (i.e., another blockchain channel). Still, such a method would increase the difficulty of blockchain development and complexity of data management as a project member may enroll in multiple blockchain networks.

That is, there is a need for people in the art to find solutions to problems like: (1) how to protect access to sensitive BIM data when collaborating with a blockchain system and IPFS network system; and (2) how to conduct design coordination in an access-controlled IPFS-blockchain integrated network.

SUMMARY OF THE INVENTION

Therefore, the present disclosure aims to provide a confidentiality-minded framework (CMF), a blockchain-based and access-controlled environment for secure BIM design collaboration. Briefly, the CMF is built on two decentralized networks, in which an Interplanetary File System (IPFS) network is responsible for storing large-sized design files (e.g., BIM models), while a blockchain network is leveraged to keep and exchange design information (e.g., design changes). In the CMF, two new modules are developed: (1) an access control module and (2) design coordination module. The access control module prevents unauthored access to sensitive BIM data in a transparent blockchain.

In accordance to one aspect of the present invention, a computer-implement method for performing Building Information Modelling (BIM) design collaboration via Confidentiality-Minded Framework (CMF) using Interplanetary-File-System (IPFS)-Blockchain integrated network by a server is provided. The method includes: segregating, by an access control module executed by a processor of the server, one or more sensitive and non-sensitive BIM portions of a BIM object; uploading, by a provider terminal, a target BIM component into an IPFS network; receiving, by the access control module, a target content identifier (CID) of the target BIM component from the IPFS network; determining whether the target BIM component has one or more of the sensitive portions, wherein if the target BIM component has one or more of the sensitive portions, encrypting, by the access control module, the target CID to obtain a target encrypted CID (ECID), and adding the target ECID into a target blockchain ledger as a target transaction via a target smart contract; else if the target BIM component does not have any of the sensitive portions, adding, by the access control module, the target CID into the target blockchain ledger as the target transaction via the target smart contract. Furthermore, the method further includes: accessing, by a reviser terminal, the target transaction to download the target BIM component from the IPFS network; and performing, by the reviser terminal, a design coordination operation on the target BIM component, so as to distributing revised target BIM component to a receiver terminal via the access control module, the target blockchain ledger and the target smart contract.

In accordance to another aspect of the present invention, provided is a server connecting to an IPFS-blockchain integrated network for performing the afore-described method, and the server includes at least one processor configured to execute machine instructions to implement the method described above.

In accordance to another aspect of the present invention, a system for performing a BIM design collaboration via CMF using IPFS-Blockchain integrated network is provided, and the system includes one or more processors configured to execute machine instructions to implement the method described above.

As this disclosure is one of the first works conducting BIM-based design collaboration in an access-controlled blockchain network, the design coordination module proposes new design strategies are proposed accordingly. The provided method can achieve objectives as below:

(1) Providing an access control module/model in CMF. In the CMF, a decomposition method is proposed to partition BIM models into sensitive and non-sensitive components (data segregation). This method helps to define which part of the BIM data should receive access control. Subsequently, an encryption-blockchain integrated approach is designed to enable access control by encrypting sensitive BIM data within the blockchain. All project members would keep these encrypted design records in their ledger, but only authorized members are given the access to decrypt these data. Moreover, a blockchain smart contract is developed to disseminate the encryption key and share design information.

(2) Providing new strategies for BIM design coordination in CMF by the design coordination module. Unlike traditional design platforms where members collaborate on complete BIM models, CMF allows members to work on partial BIM models (i.e., BIM components) in an access-controlled blockchain network. Thus, new component-based design workflows are proposed for design coordination. Besides, an original BIM Merkle Tree (BMT) data model and BMT algorithms are provided for BIM data versioning in CMF by the design coordination module.

BRIEF DESCRIPTION OF THE DRAWINGS

Embodiments of the invention are described in more details hereinafter with reference to the drawings, in which.

DETAILED DESCRIPTION

In the following description, methods and apparatuses for performing Building Information Modelling (BIM) design collaboration via Confidentiality-Minded Framework (CMF) using Interplanetary-File-System (IPFS)-Blockchain integrated network and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
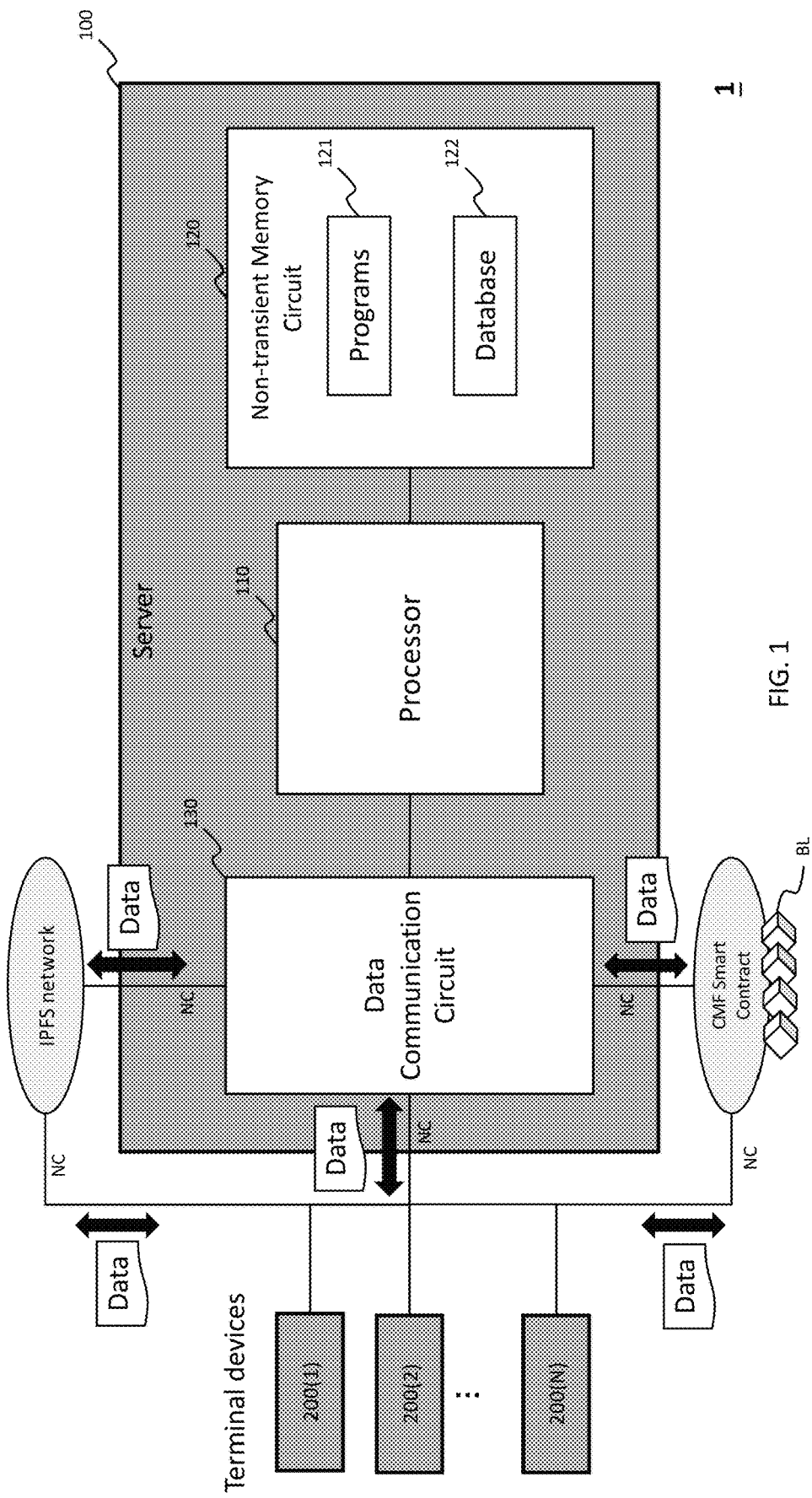
FIG. 1 depicts a block diagram illustrating a system performing a BIM design collaboration via CMF using IPFS-Blockchain integrated network in accordance with one embodiment of the present invention.

Referring to FIG. 1 for the following description. In accordance with various embodiments of the present invention, provided is a design collaboration system 1 includes a server 100 and one or more terminal devices 200(1)-200(N). Each of the terminal devices can be, for example, a smartphone, a PC, a computer device, a mobile device or an electronic device. Each terminal device has one or more processor configured to manage overall operations of the terminal device.

The server 100 includes a processor 110, a non-transient memory circuit 120 and a data communication circuit 130. The non-transient memory circuit 120 is configured to store machine instructions (or programs) 121 and to host the database 122. The database 122 may be used to store parameters/models for functioning the CMF (e.g., the BIM Merkle Tree model) and corresponding smart contract, and received data (design model, raw design data, and partial design model).

The data communication circuit 130 is configured to establish the network connection NC to the terminal devices 200, the IPFS network, CMF smart contract, a blockchain ledger and an internet (not shown). Furthermore, the terminal devices also establish network connection to the IPFS network, the CMF smart contract, the blockchain ledger and the internet (not shown). The network connection(s) can be wired or wireless data communication connection(s), and are configured to transferring data. The transferred data includes: encryption keys, private keys, public keys, complete data model (e.g., whole BIM model), partial data model (e.g., BIM component), content identifications (CID), transactions, requests, responses and instructions.

The processor 110 executes the machine instructions 121 to implement the provided methods in accordance to the embodiments of the present invention. The machine instructions 121 or the programs 121 includes: an access control module (program module); and a design coordination module (program module). The access control module includes: a data decomposing module, an encryption-blockchain integrated module; and CMF smart contracts. The design coordination module manages component-based design workflows by using BIM Merkle tree (BMT) data model and corresponding BMT algorithm. The details of the provided methods and related models are described below.

Figure 2:
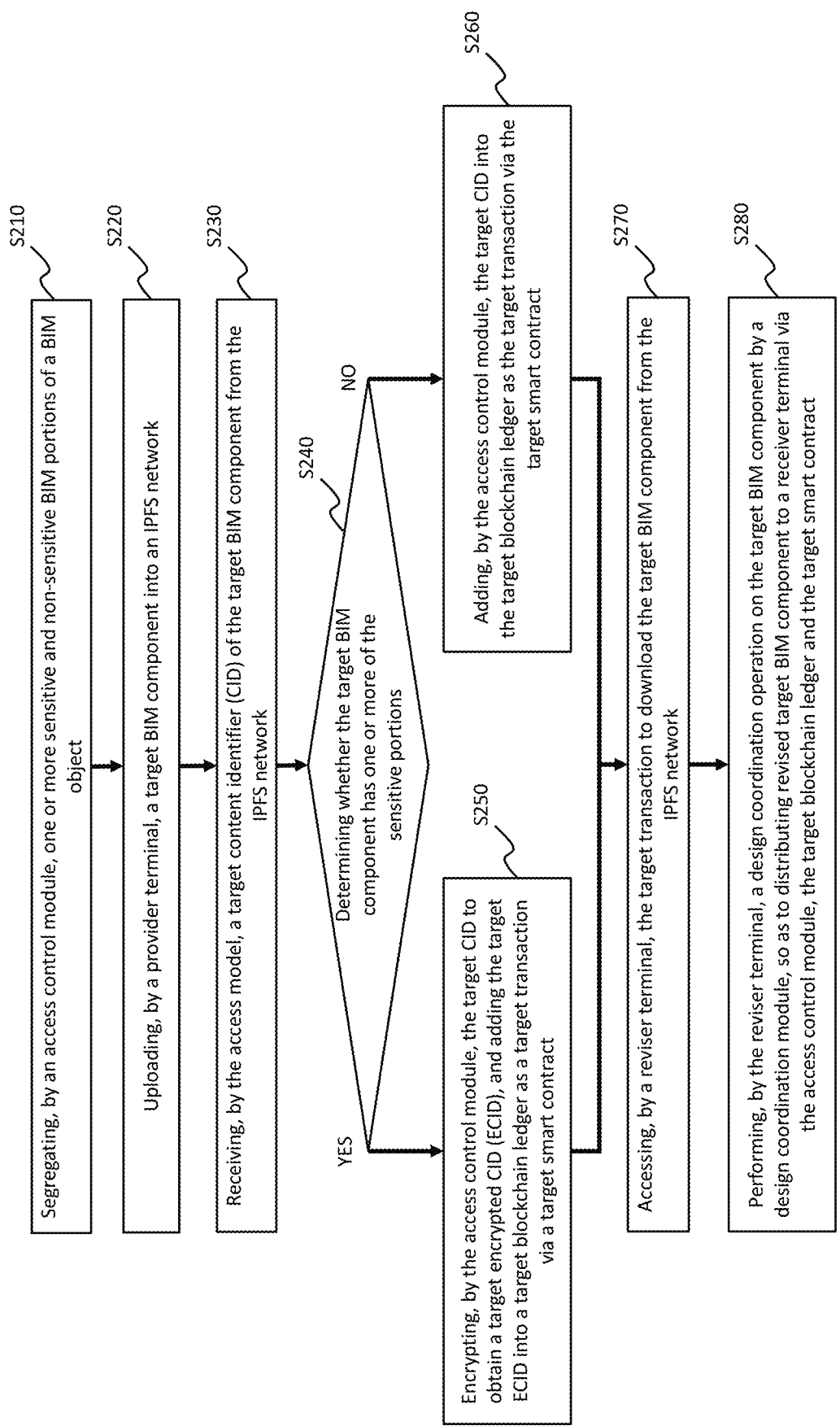
FIG. 2 depicts a flowchart of a method implemented by the provided server.
Figure 8A:
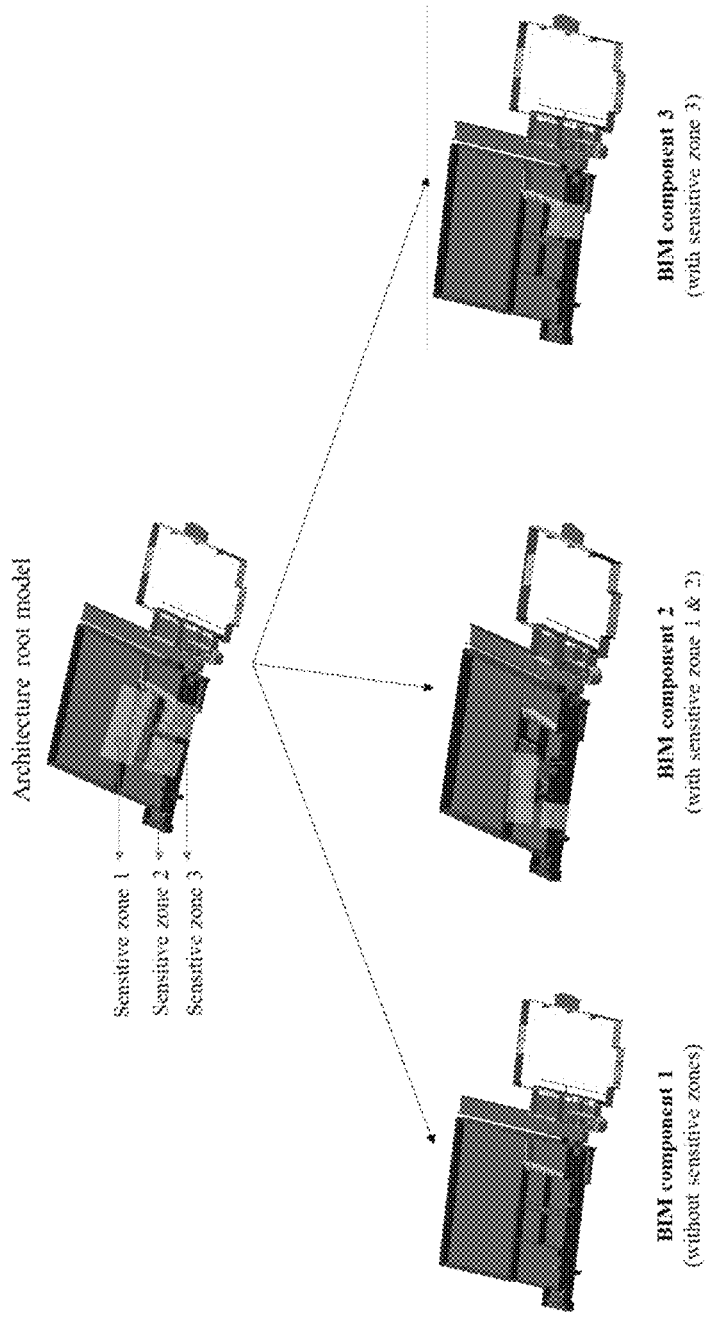
FIG. 8A depicts a schematic diagram of an example of decomposing an architecture model.
Figure 8B:
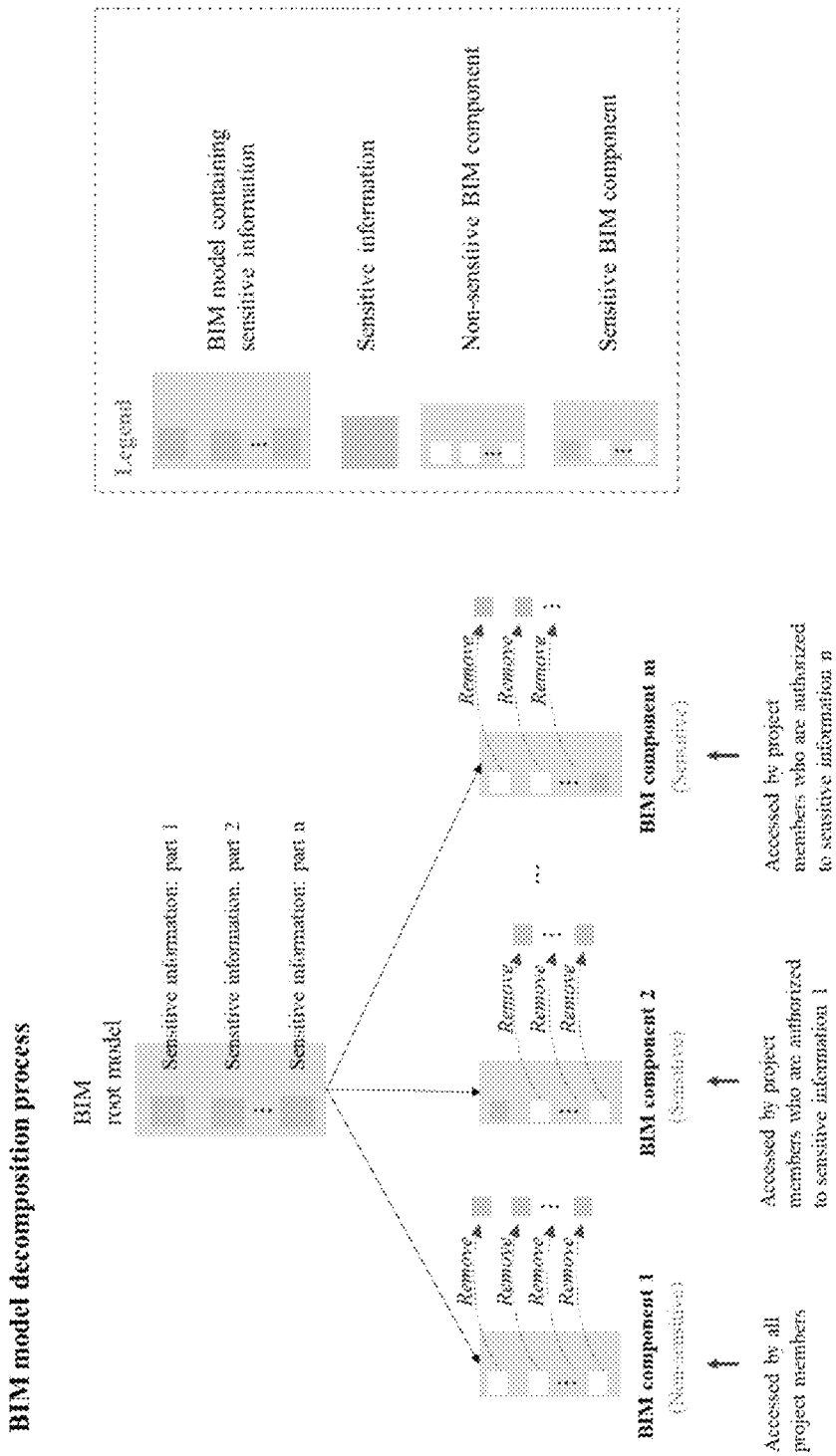
FIG. 8B depicts a schematic diagram of BIM model/object decomposition process.

Referring to FIG. 2, in step S210, the access control module executed by the processor 110 segregates one or more sensitive and non-sensitive BIM portions of a BIM object (as illustrated by FIG. 8A and FIG. 8B). Next, in step S220, a provider terminal uploads a target BIM component into an IPFS network. The provider terminal is, for example, one of the terminal devices 200 which provides a BIM component or a CID/ECID or an encryption key.

Next, in step S230, the access control module receives a target content identifier (CID) of the target BIM component from the IPFS network. Next, in step S240, the access control module determines whether the target BIM component has one or more of the sensitive portions. If the target BIM component has one or more of the sensitive portions, continue to step S250; else if the target BIM component does not have any sensitive portion, continue to step S260.

In step S250, the access control module encrypts the target CID to obtain a target encrypted CID (ECID), and adding the target ECID into a target blockchain ledger as a target transaction via a target smart contract. In step S260, the access control module adds the target CID into the target blockchain ledger as the target transaction via the target smart contract.

Next, in step S270, a reviser terminal accesses the target transaction to download the target BIM component from the IPFS network. The reviser terminal is, for example, one of the terminal devices 200 or the server 100 which revises received one or more updated BIM components, reconstruct a complete BIM model according to the received updated BIM components and original BIM components, and distributes BIM components to one or more receiver terminal.

Next, in step S280, the reviser terminal performs a design coordination operation on the target BIM component, so as to distributing revised target BIM component to a receiver terminal via the access control module, the target blockchain ledger and the target smart contract. The design coordination operation is performed by a processor executing the design coordination module.

Figure 3A:
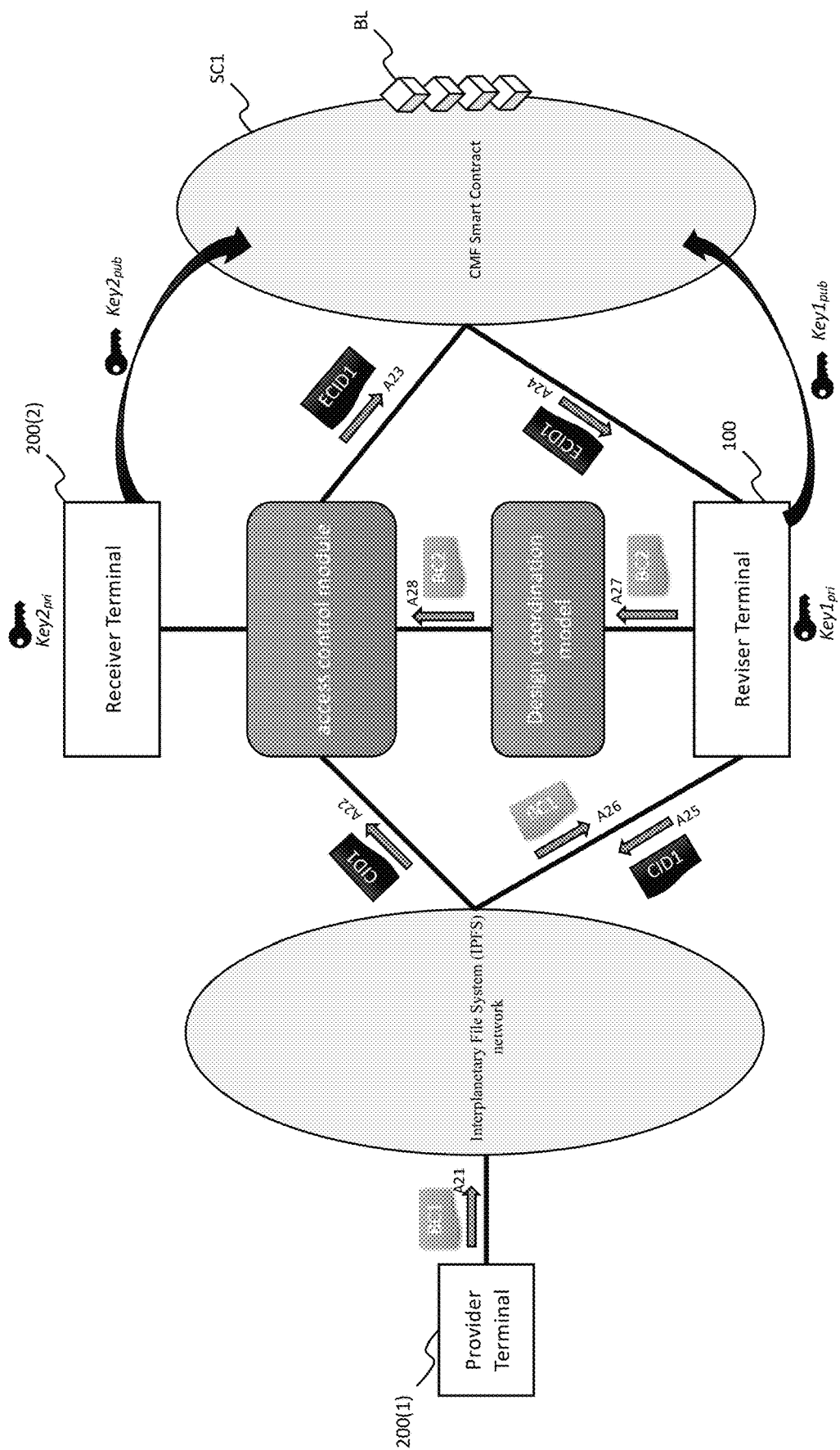
FIG. 3A and FIG. 3B depict a schematic diagram of data flows managed by the provided method.

Referring to FIG. 3A, for example, assuming that a provider terminal 200(1) is about to send a BIM component to a reviser terminal 100 for reviewing. In this case, the provider terminal 200(1) uploads a BIM component BC1

(assuming that the BC1 has sensitive portion/data in this example) into the IPFS network (as illustrated by arrow A21), wherein the BC1 is stored in, for example, a storage device (e.g., HDD) of the IPFS network. Furthermore, assuming that a reviser terminal 100 adds its public key (i.e., $Key1_{pub}$) into a blockchain ledger BL, wherein the reviser terminal 100 has a private key (i.e., $Key1_{pri}$) corresponding to the $Key1_{pub}$; and a receiver terminal 200(2) adds its public key (i.e., $Key2_{pub}$) into a blockchain ledger BL, wherein the receiver terminal 200(2) has a private key (i.e., $Key2_{pri}$) corresponding to the $Key2_{pub}$.

The processor for managing the IPFS network generates a unique content identification CID according to the data/file of the BC1, and the CID is sent to the access control module executed by the processor 110 of the server 100 (as illustrated by arrow A22). In response to determining that the CID1 is corresponding the BC1 having the sensitive portion, the access control module encrypts the CID1 to an encrypted CID (i.e., ECID1) by an encryption key (e.g., $Key1_{pub}$ of the reviser terminal). The access control module adds a transaction corresponding to the ECID1 into the blockchain ledger BL via the CMF smart contract (as illustrated by arrow A23).

Then, a reviser terminal 100 accesses the ECID1 in the blockchain ledger BL (as illustrated by arrow A24). In response to determining that the ECID1 is corresponding to a BIM component having the sensitive portion, the reviser terminal 100 decrypts the ECID1 as the CID1 via its own $Key1_{pri}$. The CID1 is then sent to the IPFS network (as illustrated by arrow A25) to download the corresponding BC1 (as illustrated by arrow A26).

After obtaining the BC1, the reviser terminal 100 revises the BC1 and updates the BC1 as BC2, and sends the BC2 to the design coordination module (as illustrated by arrow A27). The design coordination may determine how to distribute the BC2 via the access control module (as illustrated by arrow A28).

Figure 3B:
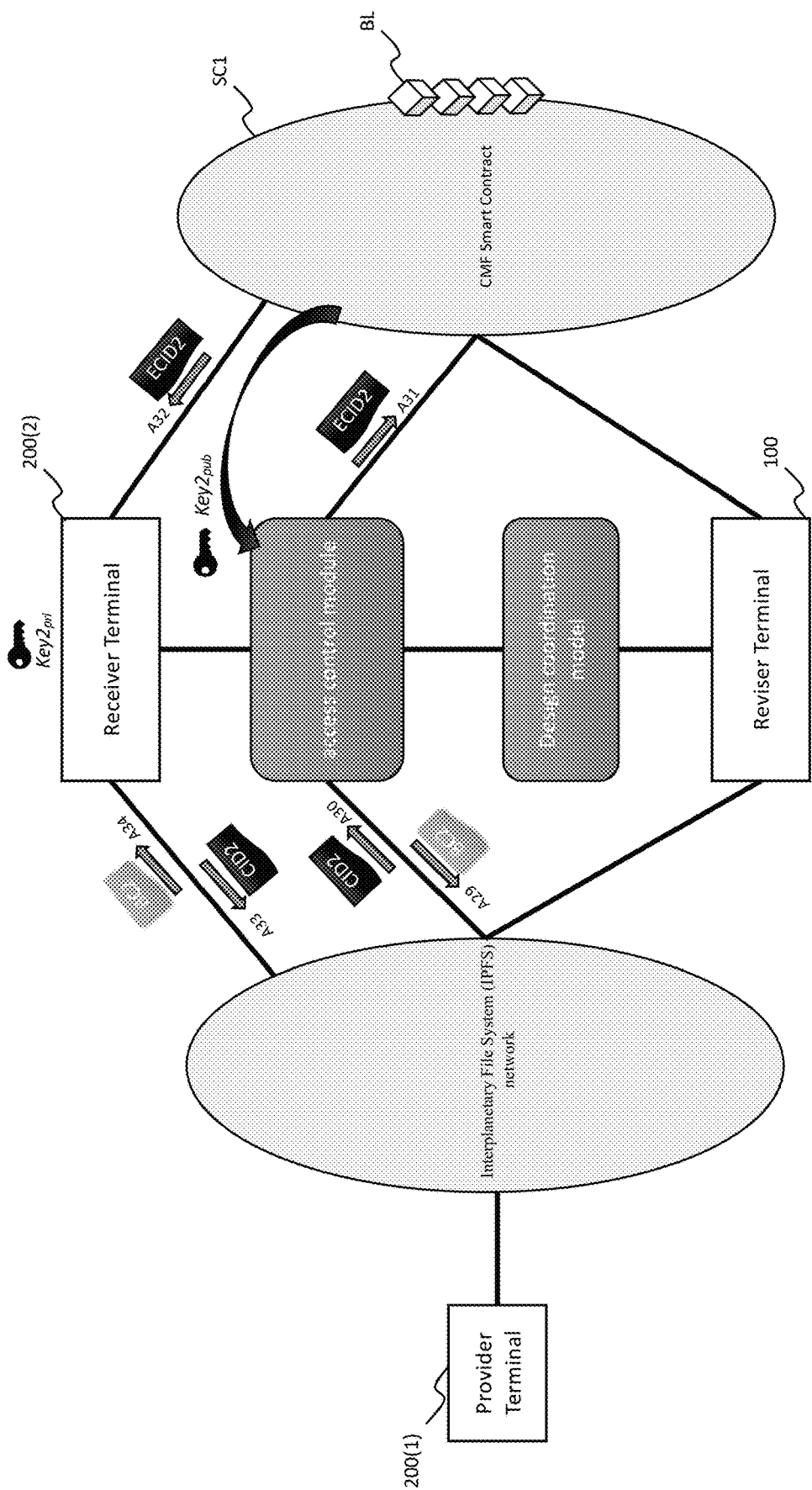

Referring to FIG. 3B, assuming that the BC2 should be distributed to the receiver terminal 200(2) according to the design coordination module, the $Key2_{pub}$ is downloaded by the access control.

The access control module uploads the BC2 to the IPFS network (as illustrated by arrow A29), and the IPFS network generates a unique content identification CID2 according to the BC2, and the CID2 is sent to the access control module (as illustrated by arrow A30).

In response to determining that the BC2 has the sensitive portion, the access control module encrypts the CID2 as ECID2 via the $Key2_{pub}$ corresponding to the receiver terminal 200(2). Then, the access control module adds the ECID2 into the blockchain ledger BL via the smart contract (as illustrated by arrow A31).

The receiver terminal 200(2) accesses the ECID2 in the blockchain ledger BL (as illustrated by arrow A32). In response to determining that the ECID2 is corresponding to a BIM component BC2 having the sensitive portion, the receiver terminal 200(2) decrypts the ECID2 as the CID2 via its own $Key2_{pri}$. The CID2 is then sent to the IPFS network (as illustrated by arrow A33) to download the corresponding BC2 (as illustrated by arrow A34).

Blockchain is inherently unsuitable for storing large-sized data (e.g., BIM model in hundreds of megabytes), thus storing BIM data is a challenge for blockchain adoption. Problems including high latency and network collapse would occur if the data size exceeds block limitation. Thus, existing studies mostly attempted to store BIM models in a central database while sharing design changes or other attributes in the blockchain ledger. However, such an idea was still limited in conceptualization as BIM data formats such as ".rvt" were not acceptable in the blockchain. Xue et al. proposed a semantic differential transaction (SDT) model to reduce data redundancy. Semantic differences among IFC files were extracted using the SDT and then stored in a blockchain as design records. In this way, design records are secured by blockchain, but a central administrator still owns BIM models (or design files).

Figure 4A:
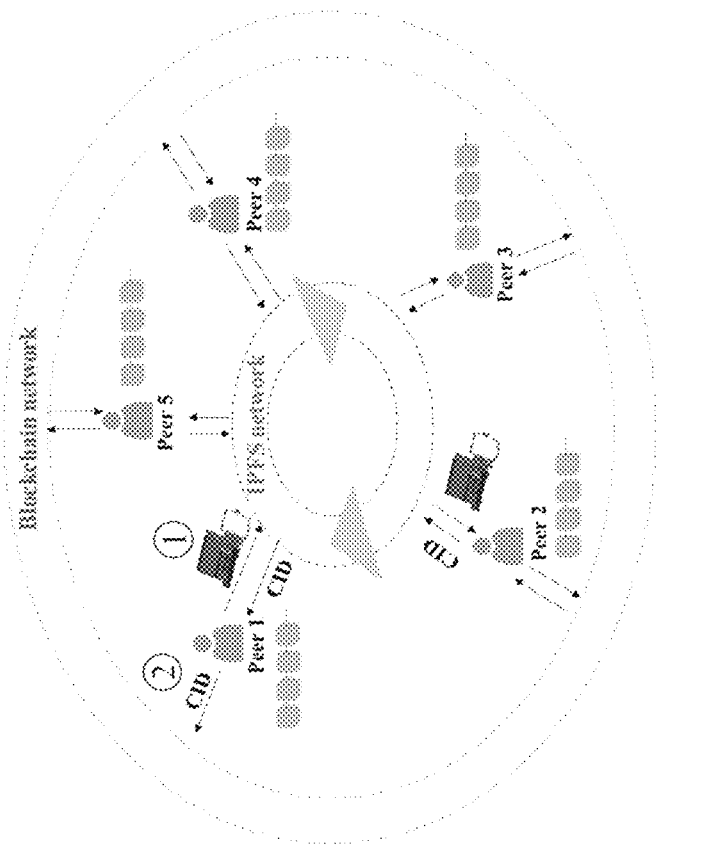
FIG. 4A depict a schematic diagram of a conventional IPFS network and an IPFS-Blockchain integrated network.
Figure 4A:
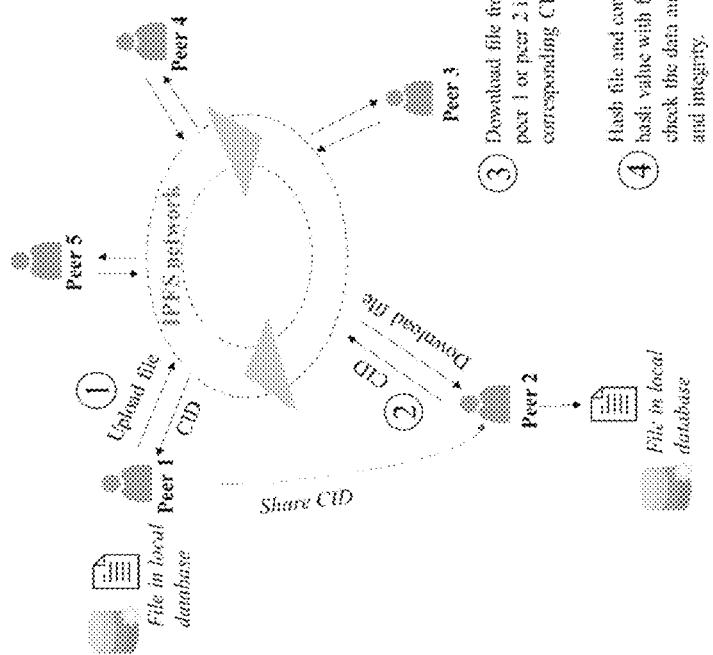

Storing both BIM models and changes in a secure and decentralized manner necessitates adopting other distributed database systems like Inter Planetary File System (IPFS). The IPFS is regarded as an appropriate technical complement to blockchain for storing large-sized files. IPFS is a peer-to-peer network that uses content-addressing to identify each file uniquely. Referring to FIG. 4A, the conventional IPFS network shows that each peer in the IPFS is a file receiver and a provider. For example, when peer 1 uploads a file in the IPFS, a unique hash content identifier (CID) is generated based on the file content (Step 1). The CID serves as the file integrity proof as well as file hyperlink. This file is currently stored in peer 1's local repository and could be downloaded by other peers using the file CID (Step 2). Now, other peers (e.g., peer 3) could access the file from either provider if they have the CID (Step 3). Besides, receivers could hash the file and compare the hash value with its CID (Step 4). The identical value can verify the data integrity and authenticity.

The conventional IPFS-Blockchain integrated network shows a generic approach to integrating blockchain with IPFS. Project members could store BIM models in an IPFS network (Step 1) and distribute CIDs (256-bit long strings) in the blockchain as transactions (Step 2). Some study summarized that combining blockchain and IPFS could: (1) improve network robustness and prevent BIM data loss by offering multiple data providers, and (2) ensure BIM data integrity as the blockchain provides immutable records storage and IPFS provides verifiable file proof (i.e., CID). However, as there is no access control in the blockchain ledger, shared CIDs could be seen by all members, who therefore could download corresponding BIM models without restriction, such that there will occur a security problem of leaking sensitive design data/information.

Figure 5A:
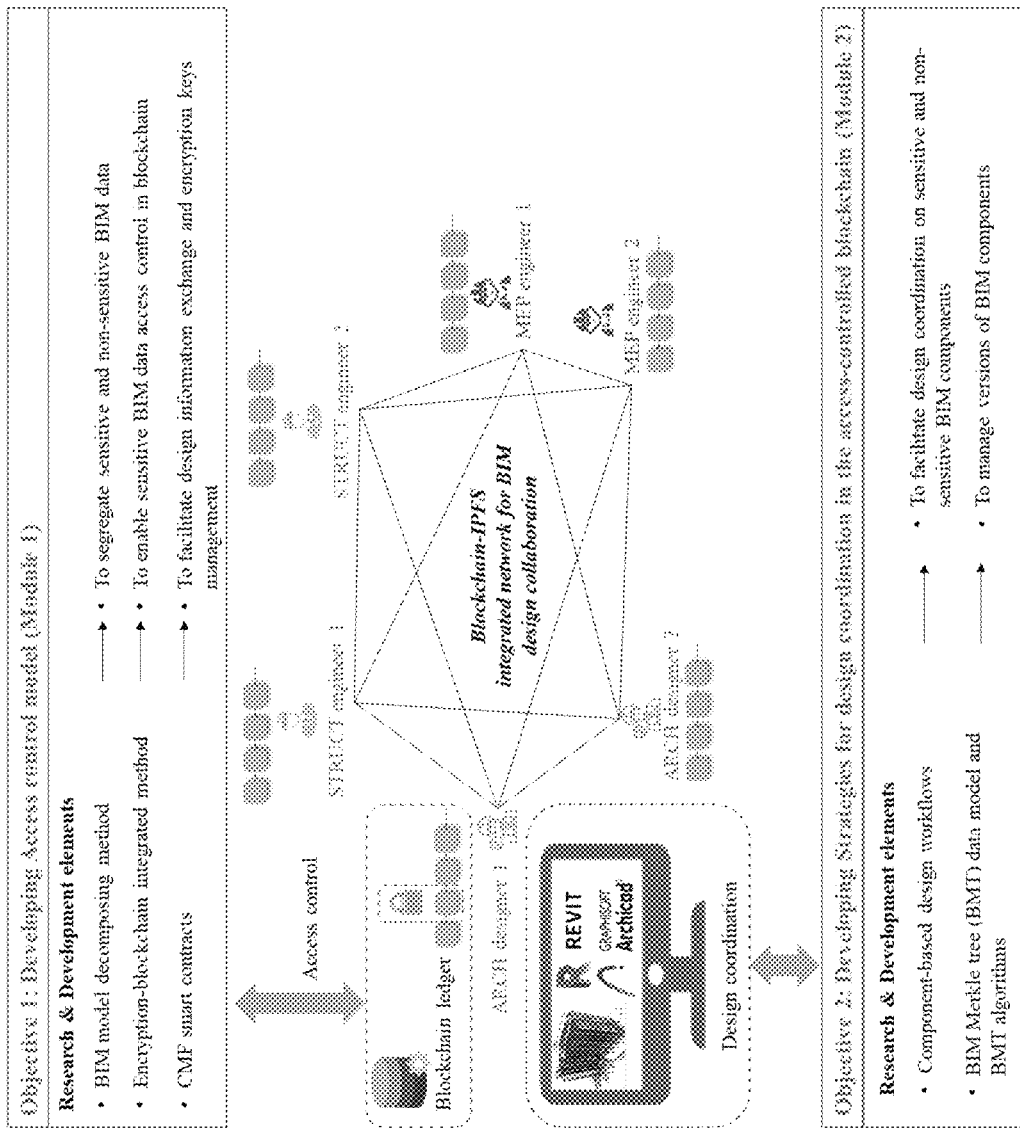
FIG. 5A depicts a schematic diagram of a proposed confidentiality-minded framework (CMF) for blockchain-based BIM design collaboration.

Thus, referring to FIG. 5A, a confidentiality-minded framework (CMF) is provided for blockchain-based BIM design collaboration. In the CMF, multidisciplinary designers collaborate in a distributed network, where a blockchain is integrated with IPFS to store design records and large-sized design files, respectively. Two novel modules are developed within the CMF: (1) access control module and (2) design coordination module. The access control model (module 1) is developed through three research and development elements: (i) a BIM model decomposition method is developed to segregate the sensitive and non-sensitive BIM data, (ii) an encryption-blockchain integrated method is proposed to encrypt sensitive BIM data in the blockchain ledger, and (iii) a CMF smart contract is developed to manage encryption keys and share design data. Furthermore, regarding the design coordination in the CMF, project members exchange partial BIM data (BIM components decomposed in module 1) instead of full BIM models. The procedures of component-based design in an access-controlled blockchain are yet to be formalized. Hence, design coordination module is provided to facilitate BIM design coordination in the CMF. This module (i.e., the second novel module) includes two elements: (i) new design workflows for coordinating sensitive and no-sensitive BIM components and (ii) a novel BIM Merkle Tree (BMT) method for BIM data versioning.

Figure 4B:
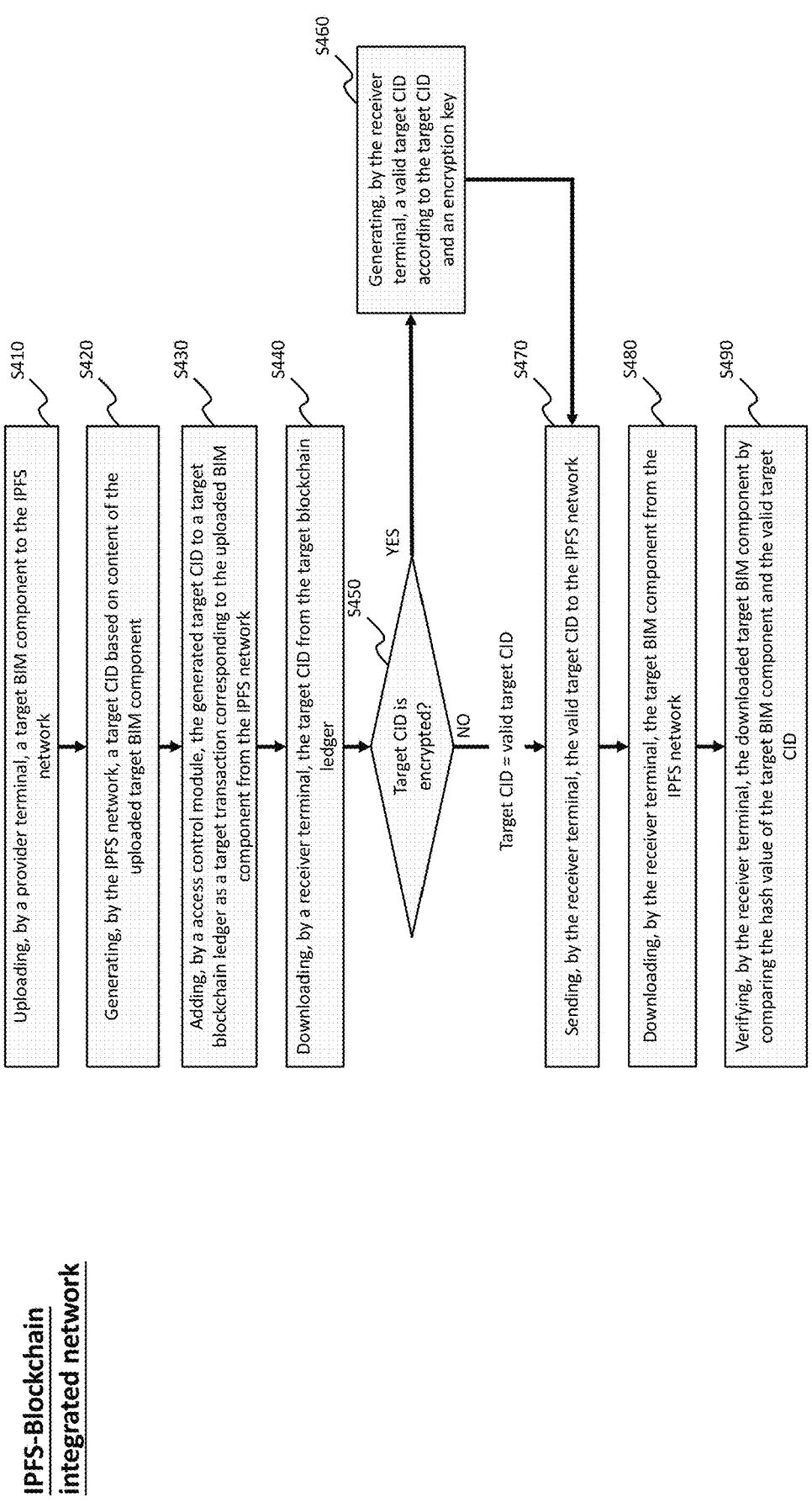
FIG. 4B depicts a flowchart of operations performed in a provided IPFS-Blockchain integrated network.
Figure 4C:
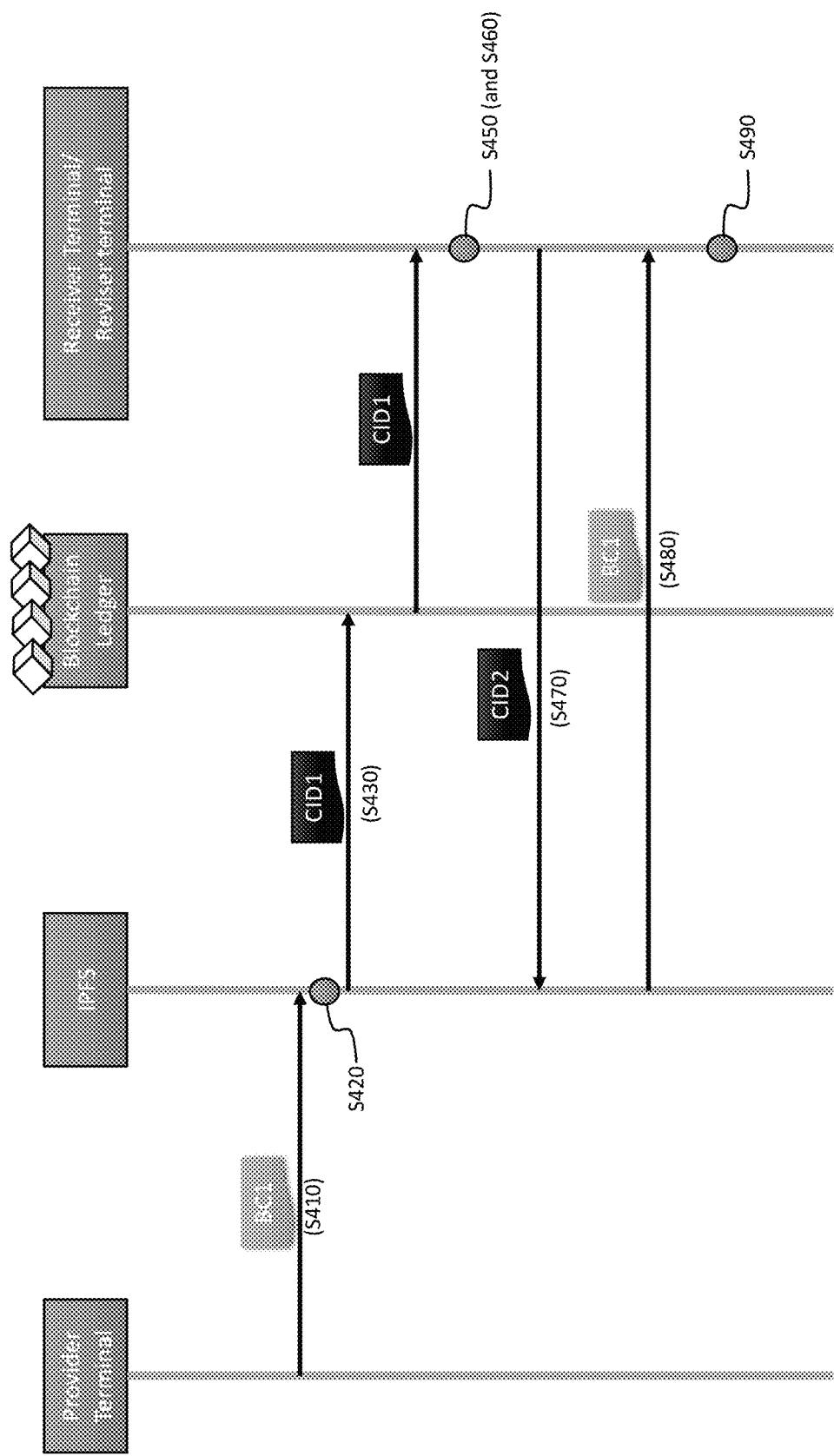
FIG. 4C depicts a schematic diagram of operations performed in the IPFS-Blockchain integrated network.

In an embodiment, for example, referring to FIG. 4B and FIG. 4C, The method of operations in the provided IPFS-blockchain network includes steps S410-S490.

In step S410, a provider terminal uploads a target BIM component to the IPFS network. Next, in step S420, the IPFS network generates a target CID based on content of the uploaded target BIM component. Next, in step S430, an access control module adds the generated target CID to a target blockchain ledger as a target transaction corresponding to the uploaded BIM component from the IPFS network.

Next, in step S440, a receiver terminal downloads the target CID from the target blockchain ledger. Next, in step S450, the receiver terminal determines whether the target CID is encrypted or not. If the target CID is encrypted, continue to step S460; else if the target CID is not encrypted, continue to step S470.

In step S460, the receiver terminal generates valid target CID according to the target CID and an encryption key (e.g., decrypts the target CID via a private key to a valid target CID).

In response to determining that the target CID is not encrypted, determining that the target CID is valid target CID, and in step S470, the receiver terminal sends the valid target CID to the IPFS network.

Next, in step S480, the receiver terminal downloads the target BIM component from the IPFS network. Next in step S490, the receiver terminal verifies the downloaded target BIM component by comparing the hash value of the target BIM component and the valid target CID.

Figure 5B:
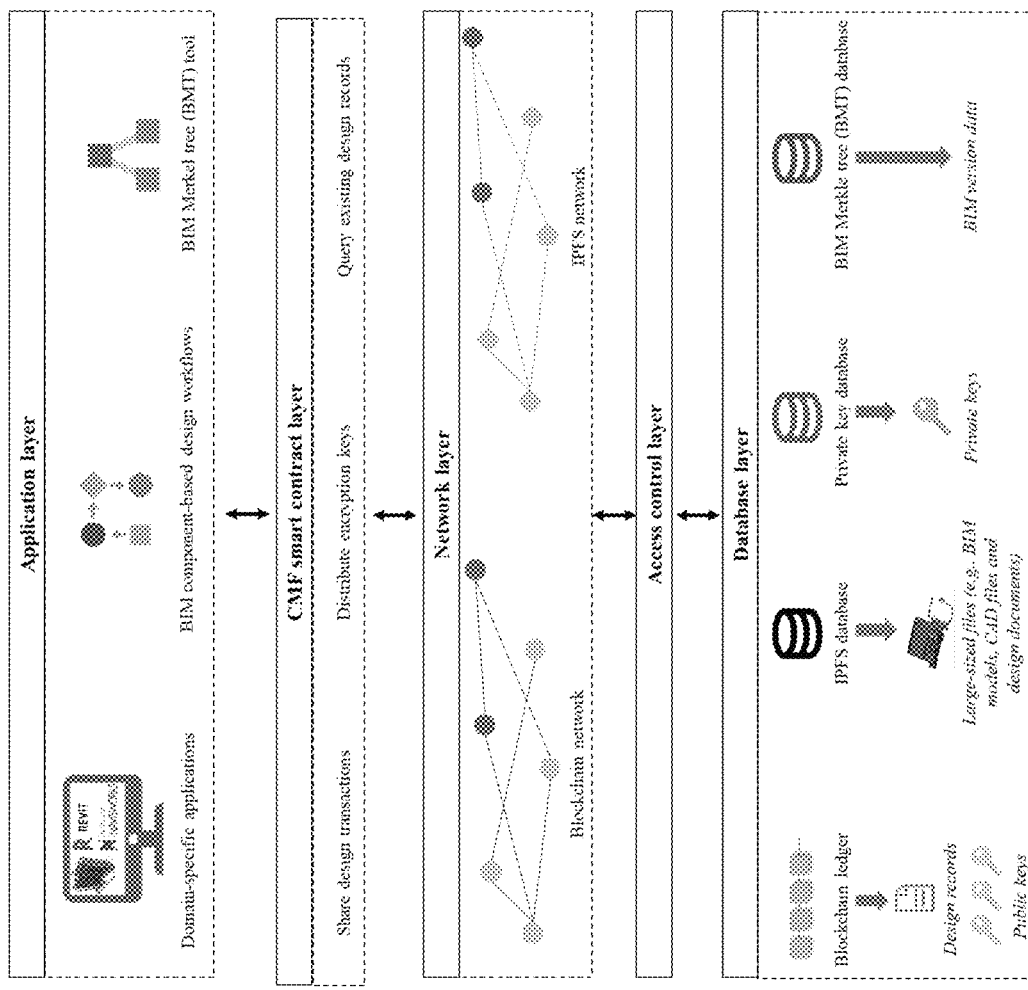
FIG. 5B depicts a schematic diagram of architecture of CMF.

Referring to FIG. 5B, the architecture of CMF is provided. In the application layer, project members (1) conduct design coordination (e.g., building BIM models, checking clashes, managing versions) (2) locally using domain-specific tools (e.g., Revit and developed BIM Merkle tree tool) and (3) following proposed design workflows. In the CMF smart contract layer, when a project member tries to share a design transaction or publish new encryption keys, he invokes smart contracts in the CMF smart contract layer. A smart contract is a trusted algorithm or computer program that can self-execute upon preset conditions that have been met. In the network layer, the network layer indicates that each member enrolls in two distributed networks, blockchain and IPFS. The access control layer protects only authorized members from accessing sensitive or confidential BIM data in a blockchain ledger. The database layer shows four databases (i.e., Blockchain ledger, IPFS database, Private key database, and BMT database) each member (terminal) owns. The blockchain stores design transactions (records), the IPFS database stores large-sized design files, private keys are placed in the private key database, and BIM version data are put in the BMT database. A consortium blockchain platform called Hyperledger Fabric is used in the CMF, because it is suitable for collaboration in the construction industry which only allows registered project members to enroll and requires minimal computing resources for "mining".

Figure 5C:
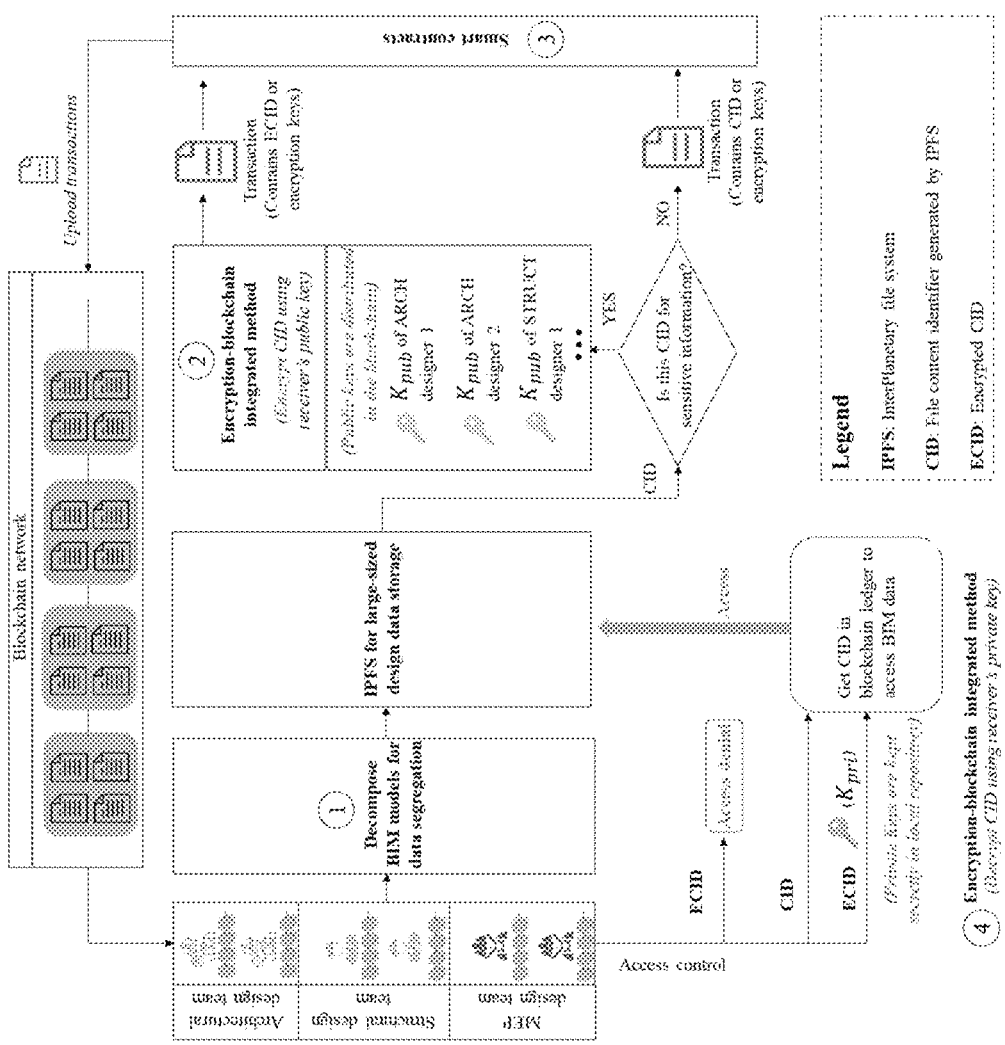
FIG. 5C depicts the provided access control model.

FIG. 5C depicts the proposed access control model, which contributes to three aspects: (1) providing a BIM data segregation method to define and extract sensitive BIM components (Step 1), (2) revealing the mechanism of how asymmetric encryption is integrated with blockchain to enable access control (Steps 2 and 4), (3) presenting the logic of how smart contract interacts with blockchain to distribute design information and manage encryption keys (Step 3).

Figure 6:
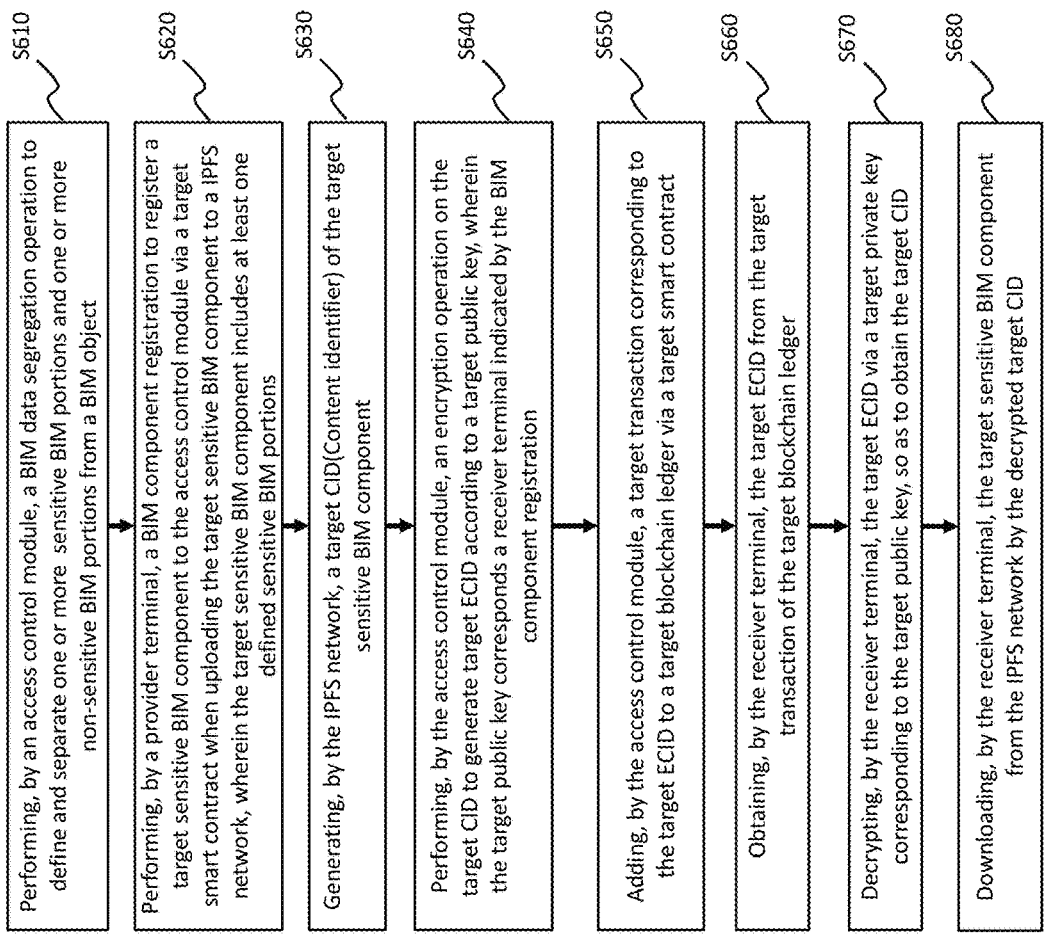
FIG. 6 depicts a flowchart of a CMF Access control method for managing sensitive data/portion to transfer in the provided IPFS-Blockchain integrated network.

For processing BIM component having sensitive portion, referring to FIG. 6, in step S610, an access control module performs a BIM data segregation operation to define and separate one or more sensitive BIM portions and one or more non-sensitive BIM portions from a BIM object (e.g., the complete BIM data model).

Next, in step S620, a provider terminal performs a BIM component registration to register a target sensitive BIM component to the access control module via a target smart contract when uploading the target sensitive BIM component to a IPFS network, wherein the target sensitive BIM component includes at least one defined sensitive BIM portions. In other words, the provider terminal may tell the access control module that if the uploaded BIM component has any sensitive portion and which encryption key of a receiver terminal should be used for encrypting a target CID corresponding to the uploaded BIM component if it has one or more sensitive portions.

Next, in step S630, the IPFS network generates a target CID (Content identifier) of the target sensitive BIM component.

Next, in step S640, the access control module performs by an encryption operation on the target CID to generate target ECID according to a target public key, wherein the target public key corresponds a receiver terminal indicated by the BIM component registration. Then, in step S650, the access control module adds a target transaction corresponding to the target ECID to a target blockchain ledger via a target smart contract.

Next, in step S660, the receiver terminal obtains the target ECID from the target transaction of the target blockchain ledger. Next, the receiver terminal decrypts the target ECID via a target private key corresponding to the target public key, so as to obtain the target CID (i.e., a valid target CID). Then, the receiver terminal downloads the target sensitive BIM component from the IPFS network by the decrypted target CID.

Figure 7:
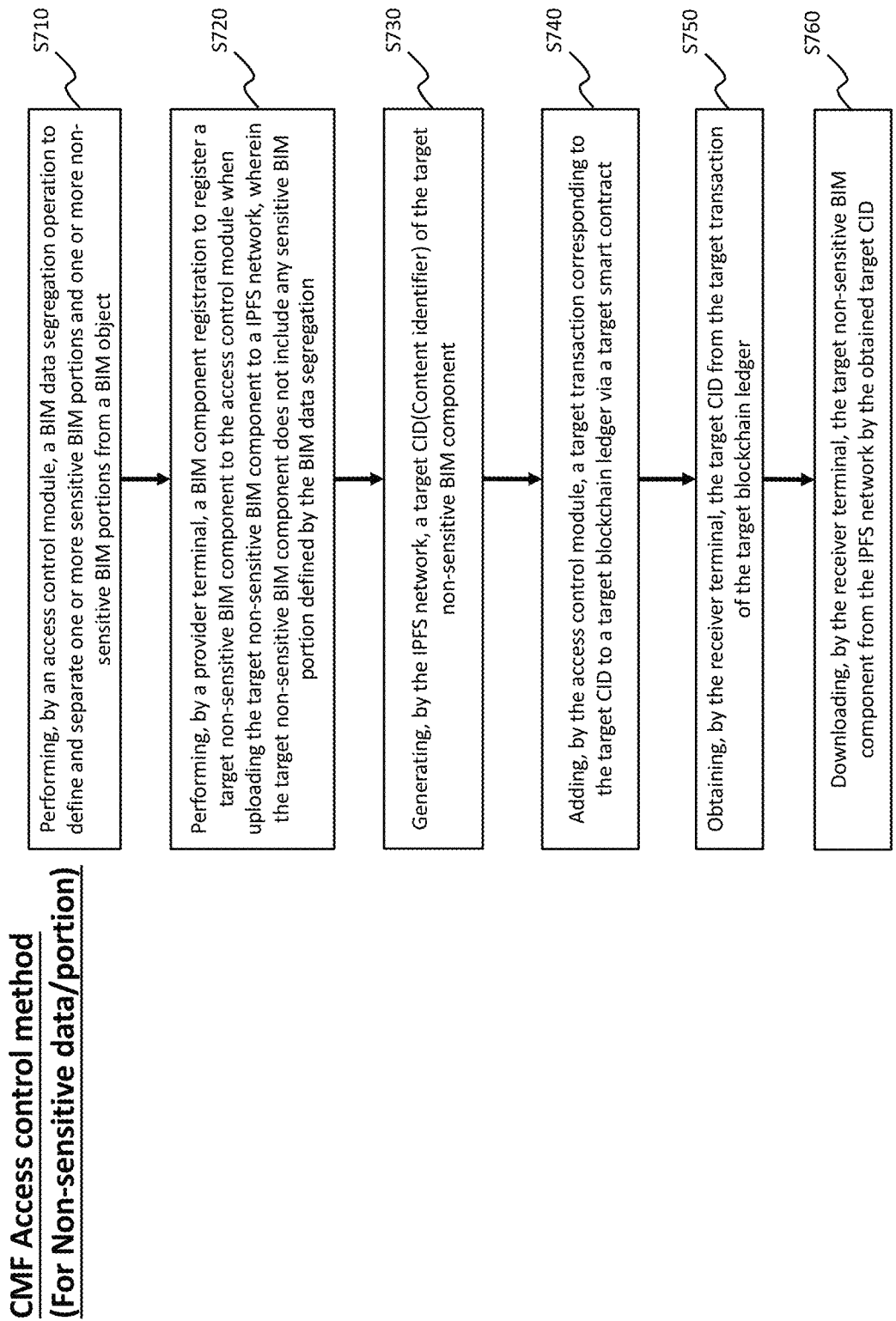
FIG. 7 depicts a flowchart of a CMF Access control method for managing non-sensitive data/portion transferred in the provided IPFS-Blockchain integrated network.

For processing BIM component not having any sensitive portion, referring to FIG. 7, in step S710, an access control module performs a BIM data segregation operation to define and separate one or more sensitive BIM portions and one or more non-sensitive BIM portions from a BIM object.

Next, in step S720, a provider terminal performs a BIM component registration to register a target non-sensitive BIM component to the access control module when uploading the target non-sensitive BIM component to a IPFS network, wherein the target non-sensitive BIM component does not include any sensitive BIM portion defined by the BIM data segregation.

Next, in step S730, the IPFS network generates a target CID (Content identifier) of the target non-sensitive BIM component. Next, in step S740, the access control module adds a target transaction corresponding to the target CID to a target blockchain ledger via a target smart contract. In other words, since the target CID does not correspond a BIM component having any sensitive portion, the access control module may directly add the target transaction of the target CID without encrypting the target CID.

Next, in step S750, the receiver terminal obtains the target CID from the target transaction of the target blockchain ledger. Next, in step S760 the receiver terminal downloads the target non-sensitive BIM component from the IPFS network by the obtained target CID.

Referring to FIG. 8A, it shows that any shared BIM models containing sensitive information would be decomposed to separate sensitive data from non-sensitive data. The basic idea of the decomposition process is to divide a root BIM model (i.e., completed BIM model) into non-sensitive and sensitive components. A non-sensitive component is a partial BIM model with all sensitive information (e.g., the layout of sensitive zones/portions) "removed", i.e., not having any sensitive information. A sensitive component refers to a partial BIM model that contains sensitive information.

Furthermore, as illustrated by FIG. 8A, a BIM model containing n sensitive parts (e.g., zones) is broken up into m components. Component 1 is a non-sensitive BIM model and may be accessed by all members. Sensitive components such as Component 2 contain both non-sensitive parts and sensitive parts. Referring to FIG. 8B, it illustrates an example showing that an architecture model with three sensitive zone layouts is decomposed into three components. Component 1 is non-sensitive as all sensitive zone layouts are removed. Component 2 keeps layouts of sensitive zones 1 and 2. Component 3 contains the layout of sensitive zone 3.

The decomposition method is the foundation for access control in the CMF as it filters the sensitive BIM data that need protection. Besides, this decomposition approach is generic and can be applied to segregate models in different domains. For example, structural engineers can share a non-sensitive component by removing sensitive structures or related design details. In addition, this is an easy-to-handle method, one such that designers only need to remove certain elements in a model to enable data segregation. Currently, decomposed and shared graphic documents are limited to 3D BIM models (e.g., built by Revit or AutoCAD), which are generic to most project practice. Besides, these models could link to open-source standards like BIM collaboration format (BCF) for design issue management. The data type and collaboration process are illustrated in Section 4.

Figure 9A:
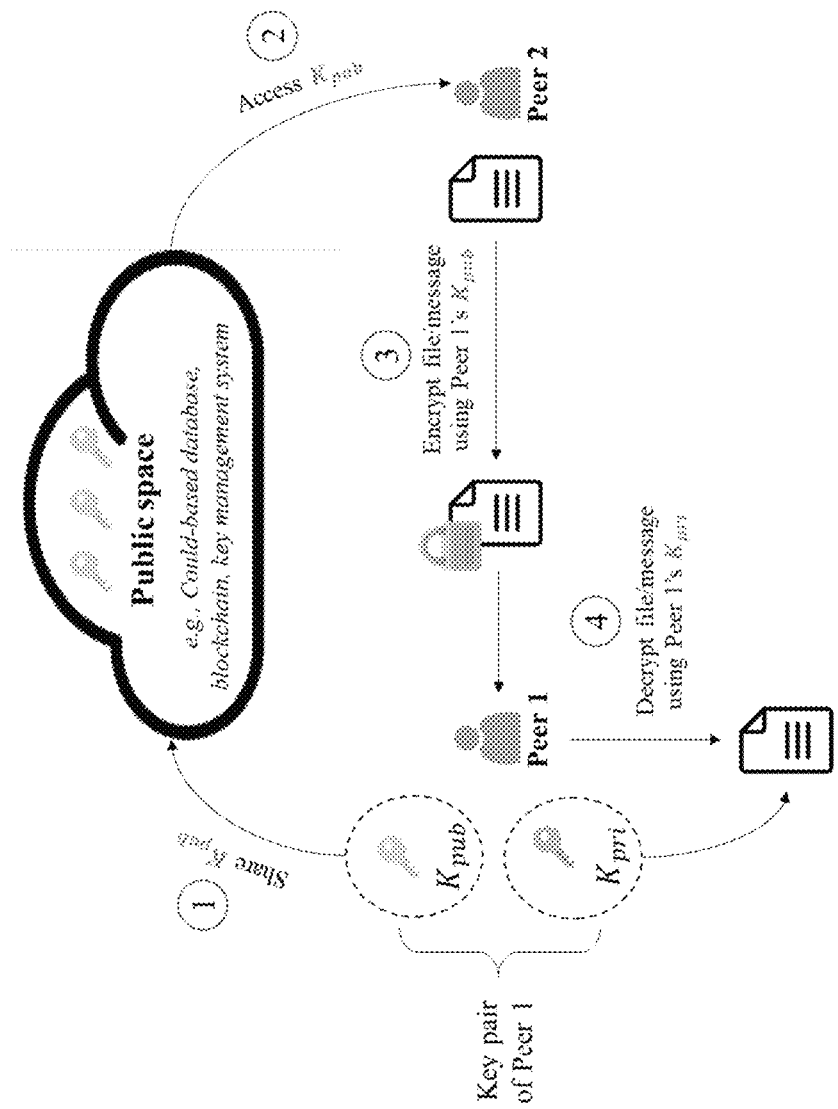
FIG. 9A depicts a schematic diagram of asymmetric encryption.

In CMF, BIM models and components are stored in an IPFS network and could only be accessed by the project member who holds corresponding CIDs. In other words, securing access to sensitive CIDs could prevent sensitive BIM data from leaking. Thus, a novel method that integrates asymmetric encryption with blockchain is developed in CMF. Asymmetric encryption (FIG. 9A) is a cryptographic system that uses key pairs, each pair comprising a public key ($K_{pub}$) and a private key ($K_{pri}$). Every peer generates a pair of keys and shares $K_{pub}$ in a public space while keeping $K_{pri}$ secret. Any peer could encrypt a message using the receiver's $K_{pub}$, but encrypted messages can only be decrypted with the receiver's $K_{pri}$. Asymmetric encryption is a fundamental technology in blockchain for peer authenticity verification, but no existing studies have adopted it to enable blockchain ledger access control.

In the access control model, project members would share their $K_{pub}$s in the blockchain network. Before a designer shares CID of a BIM component, he/she would check if the CID was sensitive. If not, he would directly propose a blockchain transaction (containing the component name, CID, version, etc.). Otherwise, he would encrypt the CID using the $K_{pub}$s of the authorized receivers (Step 2 in FIG. 5C). After that, he would broadcast a transaction with the encrypted CID (ECID) in the blockchain. This way, receivers with corresponding $K_{pri}$s can decrypt the ECID to get data links (i.e., CIDs) to download sensitive BIM data. Different from publishing $K_{pub}$s in the blockchain, project members would keep the $K_{pri}$s secretly in their local key storage database. This integrated method allows project members to share any design data in the blockchain network for collaboration while keeping sensitive data encrypted and accessed by authorized members.

There are three major innovations in the provided method. (1) The method presents how asymmetric encryption is integrated with blockchain to protect BIM confidentiality. Besides, it defines what design information (CIDs of sensitive BIM data) should be encrypted and where keys are stored and shared ($K_{pub}$s are shared in the blockchain and $K_{pri}$s are stored locally). (2) The method enables the blockchain to balance data transparency (every project member may receive all design records, encrypted or not) and data confidentiality (only authorized members may access sensitive data). (3) The method is the first time integrating asymmetric encryption with blockchain for BIM access control. Instead of managing access to each block, this approach is more practical by precisely encrypting sensitive BIM data (CIDs) in certain blocks to prevent unauthorized access.

Figure 9B:
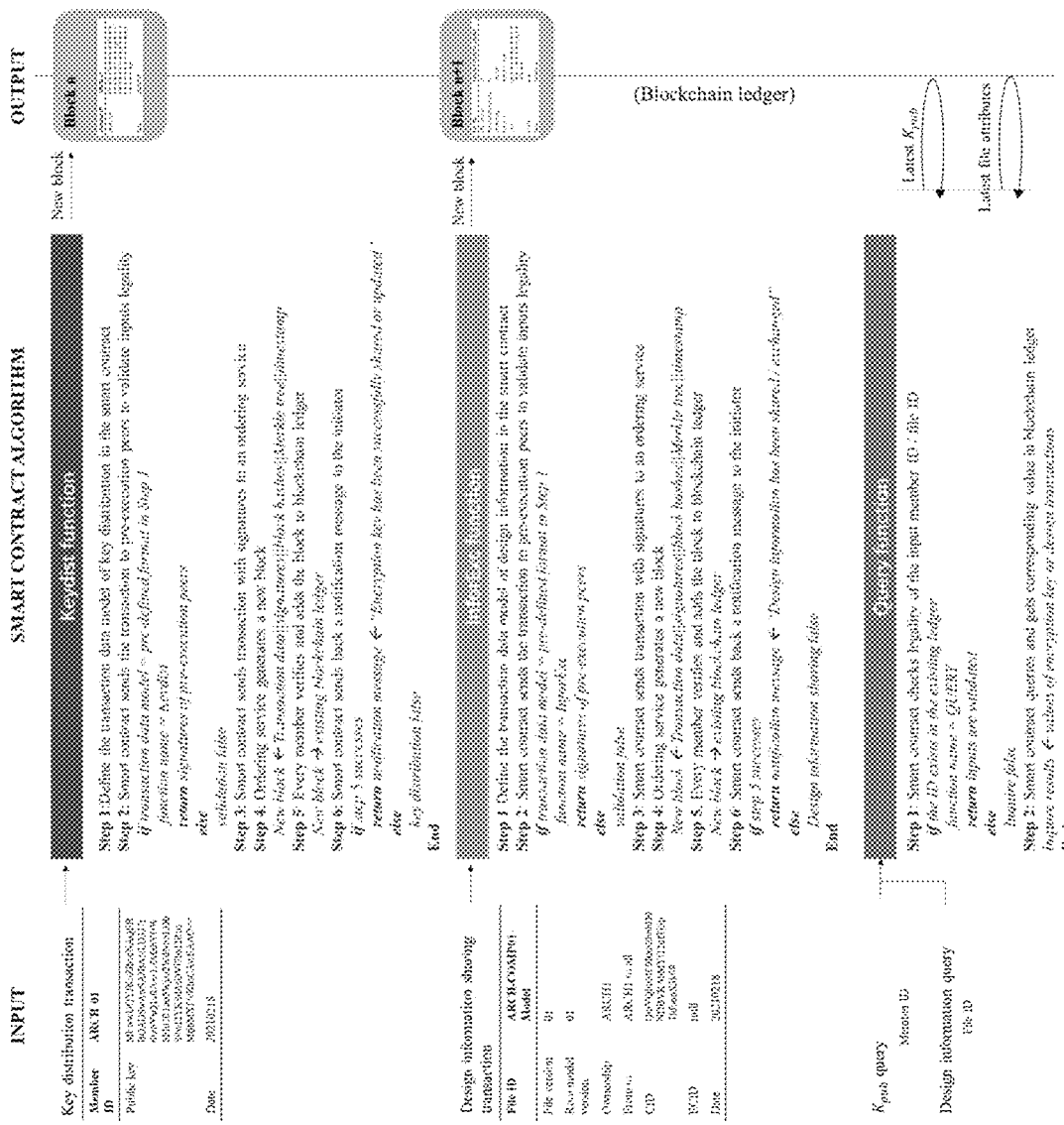
FIG. 9B depicts a schematic diagram of a provided smart contract algorithm in the CMF.

A smart contract in a blockchain allows transactions to interact with the ledger, including executing payments, sharing information, and making approval automatically. The smart contract is integral to the CMF, as it is a medium between project members and blockchain ledgers. Project members (terminal devices) can only distribute data in the blockchain ledger by invoking smart contract functions. This section identifies smart contract functions and illustrates their algorithm (as illustrated by FIG. 9B) in the CMF.

Three functions, namely, (1) key distribution (Keydist), (2) information exchange (InfoExc), and (3) query, are designed in the proposed CMF smart contract. Keydist allows project members to share or update their $K_{pub}$ in the blockchain. The input is a transaction that contains a member ID and his $K_{pub}$. The output is a new block containing the input transaction. Six steps are involved in this function. Steps 1 and 2 are to define and validate the inputs. Legal transactions will get signatures and endorsements from pre-execution peers. In Step 3, a smart contract sends the encryption keys and signatures to an ordering service, which will chronologically package transactions to ensure data consistency. In Steps 4 and 5, the smart contract will broadcast the transactions, and project members will validate and add them to their local ledger. Finally, the initiator will get a notification that the encryption key has been successfully shared or updated. InfoExc supports sharing design information across the blockchain network. The input is a design transaction containing a design file's ID, file version, data ownership, CID, etc., and the output is a new block that includes the design transaction. This function has similar steps with the KeyDist function except the input transaction data model. The Query function allows users to access $K_{pub}$ and existing design information in the blockchain ledger. For the querying public key, the input is a particular member's ID, and the smart contract would return the latest $K_{pub}$. Similarly, the smart contract would return a design file's attributes if the input is a file ID.

Figure 9C:
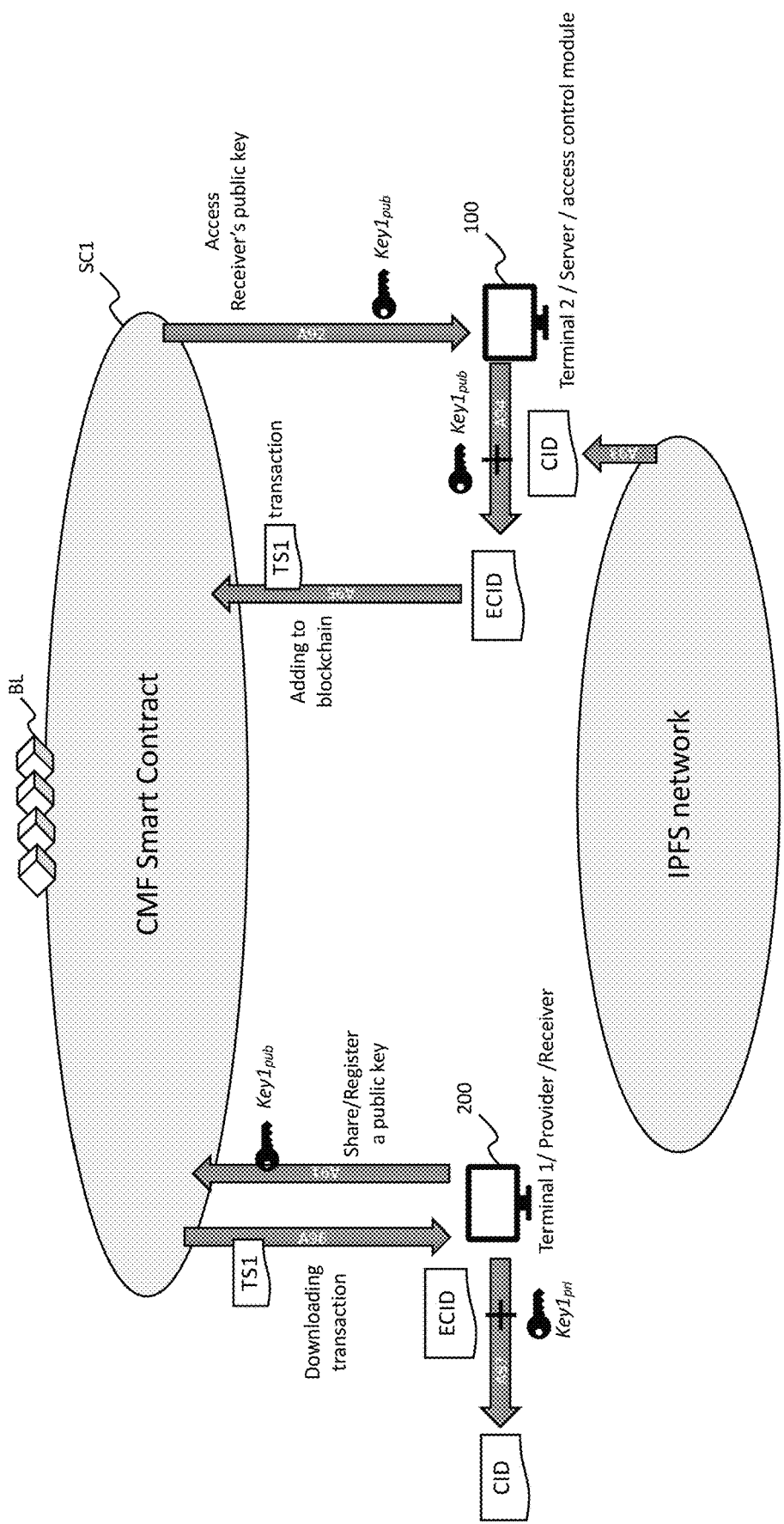
FIG. 9C depicts a schematic diagram of a provided asymmetric encryption method used for the provided IPFS-Blockchain integrated network by a provided access control module.

Referring to FIG. 9C, for example, the terminal1 200 sharing/registering a public key ($Key1_{pub}$) to the blockchain ledger BL via a CMF smart contract (as illustrated by arrow A91). Terminal2 100 access the $Key1_{pub}$ from the blockchain ledger BL via the smart contract (as illustrated by arrow A92), and download a CID from the IPFS network (as illustrated by arrow A93). The terminal2 encrypts the CID to ECID via the $Key1_{pub}$ of the receiver 200 (as illustrated by arrow A94). The ECID is added into the blockchain ledger BL via the smart contract as the transaction TS1 (as illustrated by arrow A95). The receiver, terminal2 200 downloads the transaction TS1 from the blockchain ledger BL (as illustrated by arrow A96), and obtains the ECID by the transaction TS1. The terminal1 200 decrypts the ECID to CID via the private key (Key1$_{pri}$) (as illustrated by arrow A97). Then, the decrypted CID can be used to download the corresponding uploaded BIM component from the IPFS network.

Figure 10A:
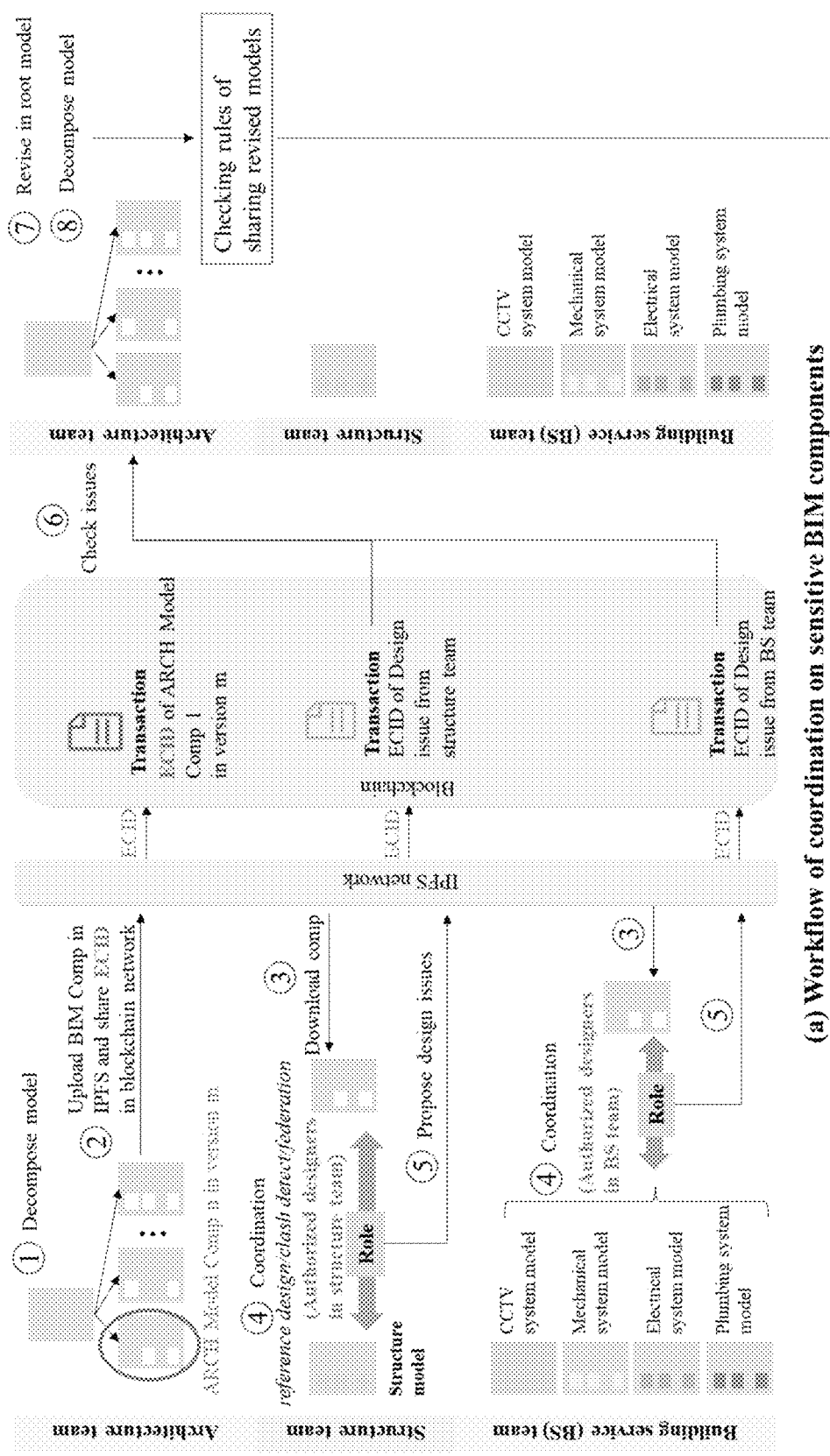
FIG. 10A depicts a schematic diagram of a workflow of coordination on sensitive BIM components.
Figure 10B:
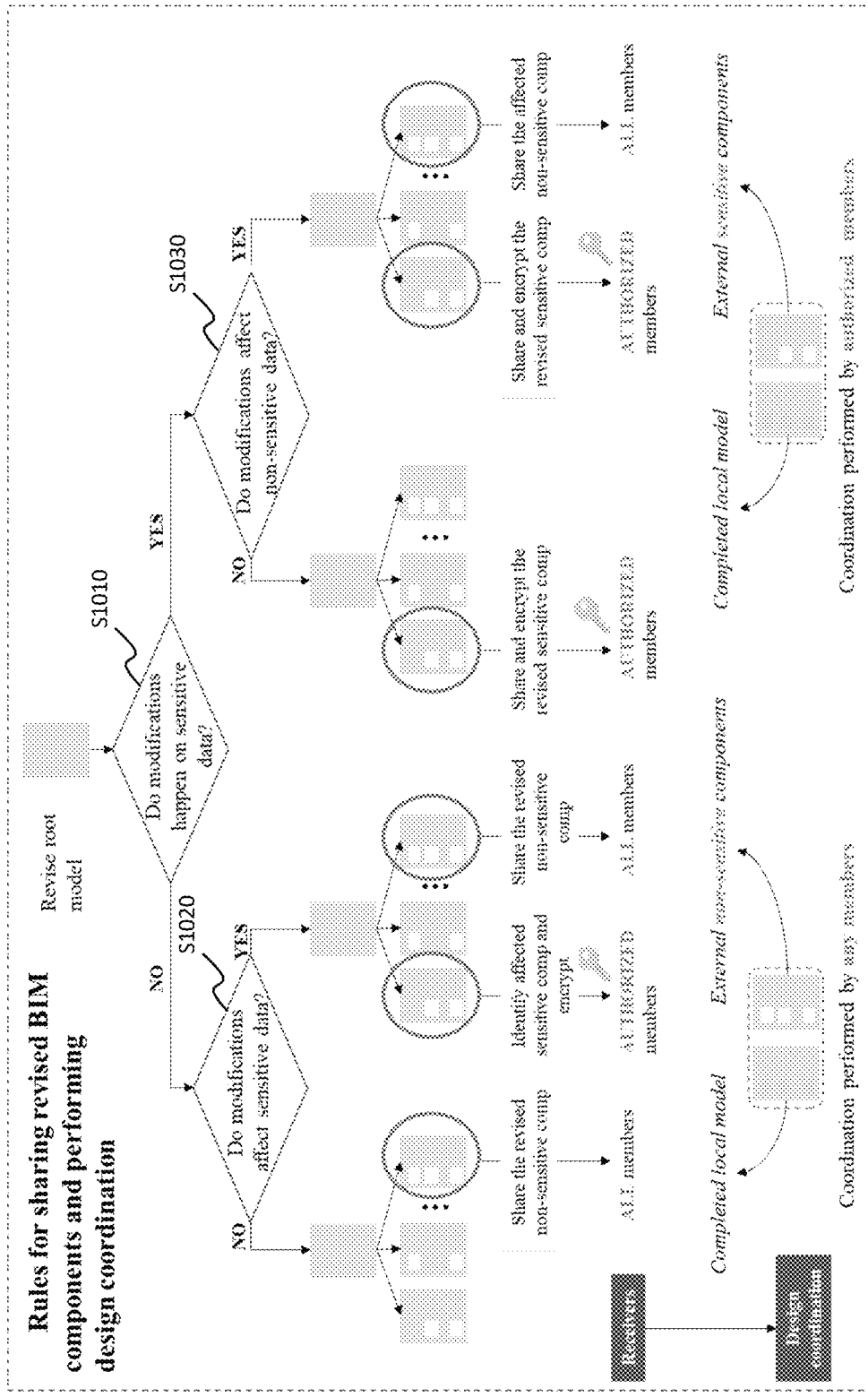
FIG. 10B depicts a schematic diagram of rules for sharing/distributing revised BIM components and performing design coordination.

Referring to FIG. 10A and FIG. 10B for following descriptions, FIG. 10A shows the coordination workflow on sensitive BIM components, and FIG. 10B shows the rules for sharing revised BIM components and performing design coordination. One assumption is that project members have full access to the BIM models of their own domain, and only authorized members may access sensitive components from other disciplines.

In FIG. 10A, one design team (e.g., architecture team) decomposes a BIM model (Step 1) and shares the encrypted CID (ECID) of a sensitive component (Comp n in version m) in the blockchain (Step 2). Only authorized members in the structure or MEP team can download (Step 3) and decrypt it. In this way, sensitive data in one domain could be visible to authorized members in other disciplines; thus, coordination can continue (Step 4). During this process, structural and MEP designers may federate this component with completed BIM models of their domains for reference design or clash detection. After that, they would propose encrypted design issues (e.g., design issues) in the blockchain (Step 5). The architecture team would check these issues (Step 6) and revise the root architectural BIM model (Step 7). Finally, the architecture team would decompose the revised BIM model (Step 8) and share the updated component (Comp n in version m+1), repeating Steps 2 to 6.

Considering modification on non-sensitive data may affect sensitive data (and vice versa) in a model, rules for model sharing after revising are regulated after Step 8. Details are shown in FIG. 10B. When root model changes happen on non-sensitive data, the modeler should judge if these modifications impact sensitive data. If not, he only needs to decompose and share the revised non-sensitive component(s) to all members; otherwise, the affected sensitive components must be identified and encrypted to authorized members. When root model changes happen on sensitive data, similarly, the modeler should check that once the modifications impact non-sensitive data, he should all share the affected components with all members. Otherwise, only the revised sensitive components should be encrypted and shared. From the receiver's perspective, there are three rules for cross-domain coordination: (1) each member could see the whole model of his own domain; (2) any member could perform model coordination using the completed domain model with external non-sensitive BIM components and (3) authorized member could conduct the coordination using the completed domain model with external sensitive BIM components as these data are only visible to them as mentioned above. In this way, any design decisions made (on either sensitive or non-sensitive zones) could be identified and proceeded.

This workflow aligns with most existing practices in terms of (1) coordination method, (2) data access control, and (3) collaborative workflow. Specifically, in FIG. 10A, project teams can follow their conventions and software systems to build models, detect clashes, and perform reference design. The access control rules (Step 4 in FIG. 10A) also comply with existing practices that only authorized members could touch on sensitive BIM data. In addition, the development of the workflow references a generic and standard coordination solution—common data environment (CDE) framework (introduced by ISO 19650 standard)—that members create design data locally and share approved data in a public container (blockchain and IPFS network in this disclosure). Given that project teams collaborate in an access-controlled and distributed environment, there are two compulsory changes: (1) models containing sensitive information should be decomposed before sharing, and (2) sensitive data (or data CID) must be encrypted.

These workflows have two novelties: the "partial and whole coordination" and the "root BIM model revision" mechanisms. First, although data granularity (smallest unit for BIM data exchange) in CMF is BIM components, this workflow does not choose to federate external BIM components (models from other disciplines) with local components (models of their domains) in the coordination (Step 4 in FIG. 10A), which would inevitably increase collaboration difficulties and errors. Instead, this workflow uses a "partial and whole coordination" mechanism that allows members to federate external BIM components (partial BIM data) with their local completed BIM models (whole BIM data). This mechanism offers a more manageable and feasible coordination process as well as protects sensitive data against illicit access. Besides, as there are common data (e.g., non-sensitive data) among parallel BIM components (components with the same root model), any revisions of components will not be fully independent (i.e., the revision will also affect other components). The "root BIM model revision" mechanism (Step 7 in FIG. 10A) regulates and ensures that if there are design change requirements for a BIM component, the revision work would be conducted in its corresponding root model instead of in the component itself. Updated components could be generated by decomposing the root BIM model again. This mechanism ensures data consistency as all parallel components are updated simultaneously.

Versioning of a complete BIM model only requires managing versions of this single model. In CMF, BIM data have a two-layer structure (i.e., root model layer and components layer) for access control purposes. Thus, simultaneously managing (1) versions of root model and components and (2) the relationship between two layers is a challenge in CMF. A Merkle tree or hash tree is a hash-based data structure in which the leaf node is the data hash, and each non-leaf node is a hash of its children. The Merkle tree has been used in distributed systems for efficient data verification and versioning. Merkle tree can trace changes by only comparing top hashes of two model files. However, the traditional Merkle tree has two limitations in managing BIM version. First, Merkle tree nodes only contain hash values and cannot store metadata like BIM model name, version, etc. Second, Merkle tree only allows one-way data verification from leaf to root and cannot retrieve data reversely, making it difficult to manage relationship between BIM components (leaf nodes) and root BIM model. Thus, the presented disclosure proposes a novel BIM Merkle tree (BMT) data structure for BIM data versioning.

Figure 11A:
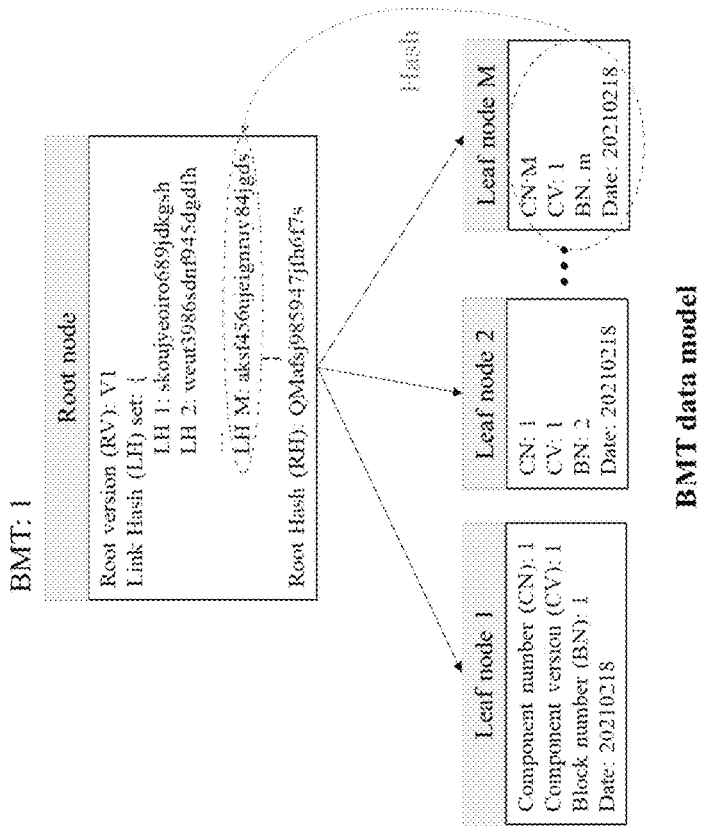
FIG. 11A depicts a schematic diagram of BMT initialization algorithm.

A BMT is initialized as illustrated by FIG. 11A. The BMT has two layers in which leaf nodes contain version information of components, and the root node contains version information of the root model. In a leaf node, the component number (CN) is the ID of a particular component. The component version (CV) is the current version status of the component. The block number (BN) indicates which block in the blockchain stores the metadata (e.g., CID) of this component. Thus, project members could query the blockchain ledger to access detailed components information. In the root node, the root version (RV) refers to the current version of the root BIM model. A link hash (LH) set is composed of the hash values of each leaf node's data. These link hashes function as pointers between the root and leaf nodes. In this way, project members could retrieve the leaf nodes from the root node via the corresponding LH. These hashes would be hashed again to generate a root hash (RH) for data verification.

The right portion of FIG. 11A shows the BMT initialization algorithm. The input is a component's information. In Step 1, leaf nodes are generated to form a component information (or leaf node) set. In Step 2, link hashes of the leaf nodes are calculated to form a link hash set in the root node. In Step 3, the root hash is computed based on the link hashes. The outputs are the four parts of a BMT: component information (or leaf node) set, link hash set, root hash, and root version.

Figure 11B:
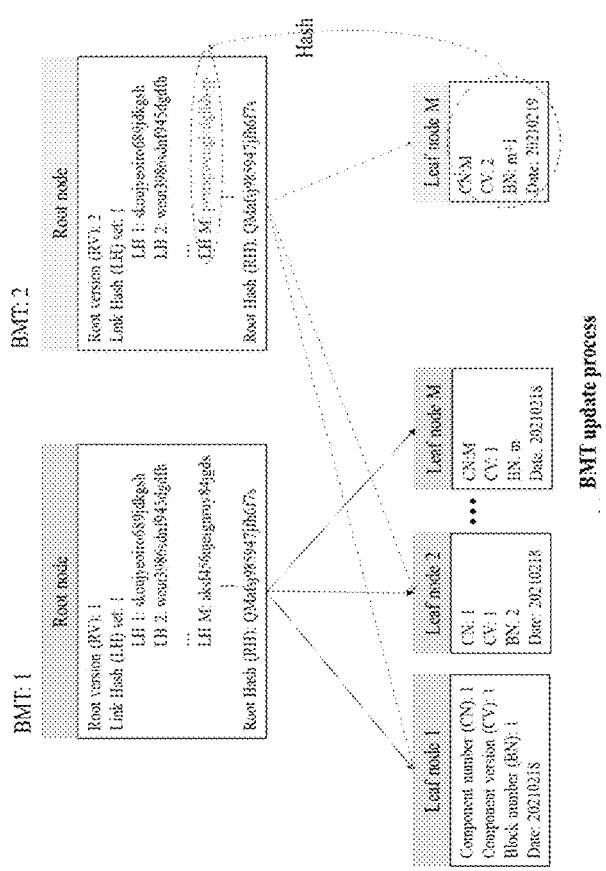
FIG. 11B depicts a schematic diagram of BMT updating algorithm.

FIG. 11B presents how BMT facilitates BIM data versioning. A new BMT (i.e., BMT 2) would be generated (as illustrated by the left portion of FIG. 11B) when there is a version update on a component. A new leaf node in an updated version and a new root node with an updated set of link hashes are created. Note that the new BMT does not reproduce leaf nodes for unchanged components. Instead, this root node is linked to the unchanged leaf nodes via link hashes inherited from previous BMTs. In this way, each BMT retains a complete set of links between the root model (root node layer) and the components (leaf node layer) without data redundancy. More importantly, project members may (1) check the latest BMT tree to see the current version of each BIM component, and (2) go through all BMTs to trace the history of changes between versions. For example, querying BMT 2 will return a result that indicates that the root model is version 2, component m is version 2, and the remaining components are version 1. The right portion of FIG. 11B shows the BMT update algorithm. The input is the information of the updated component. In Step 1, any unchanged leaf nodes, together with their link hashes, are identified. Other steps in terms of generating a new leaf node set, new link hash set, root hash, and root version are the same as the initialization algorithm.

Figure 11C:
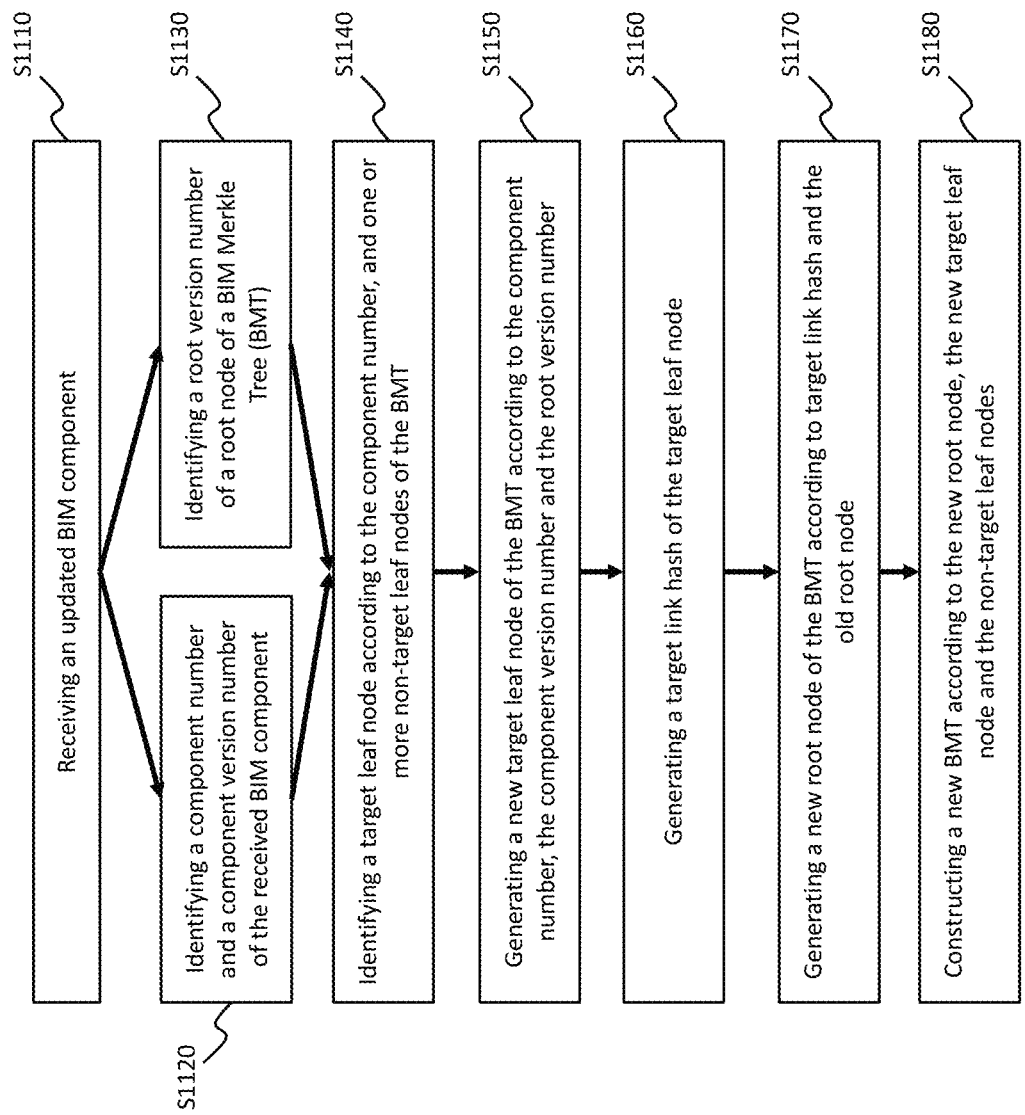
FIG. 11C depicts a flowchart of BMT updating algorithm.

For example, referring to FIG. 11C, in step S1110, the design coordination module executed by processor 110 or a processor of a reviser terminal receives an updated BIM component.

Next, in step S1120, the design coordination module identifies a component number and a component version number of the received BIM component. Furthermore, in step S1130, the design coordination module identifies a root version number of a root node of a BIM Merkle Tree (BMT).

In detail, the design coordination module maintains the BIM Merkle Tree (BMT) of the BIM design collaboration, wherein the BMT is configured to manage the design coordination operation. The BMT comprises: a root node; and one or more leaf node. The root node is configured to record: a root version number of the BMT; one or more link hash of the leaf nodes; and a root hash. Each of the leaf nodes is configured to record: a component number, configured to identify a corresponding BIM component; a component version number, configured to identify a version of the corresponding BIM component; a block number, configured to record a block index of a target block used for storing a target transaction corresponding to a CID of the corresponding BIM component; and an updated date, configured to record a date on which the corresponding BIM component is updated.

In step S1140, the design coordination module identifies a target leaf node according to the component number, and one or more non-target leaf nodes of the BMT.

Next, in step S1150, the design coordination module generates a new target leaf node of the BMT according to the component number, the component version number and the root version number. Next, in step S1160, the design coordination module generates a target link hash of the target leaf node. Next, in step S1170, the design coordination module generates a new root node of the BMT according to target link hash and the old root node. Next, in step S1180, the design coordination module constructs a new BMT according to the new root node, the new target leaf node and the non-target leaf nodes.

The BMT has three advantages. First, unlike the traditional Merkle tree that only allows one-way data verification, the novel BMT facilitates leaf-to-root data verification and root-to-leaf data retrieval via link hashes. This mechanism guarantees that the root node in any version will always be linked to the right leaf nodes, maintaining the relationship between the BIM root model and its BIM components. Second, the BMT enhances versioning efficiency by only creating new links to any components that have been newly updated, eliminating any unnecessary computation. In addition, each leaf node has component version and block number information, enabling quick locating of component data in the distributed blockchain network.

Figure 12:
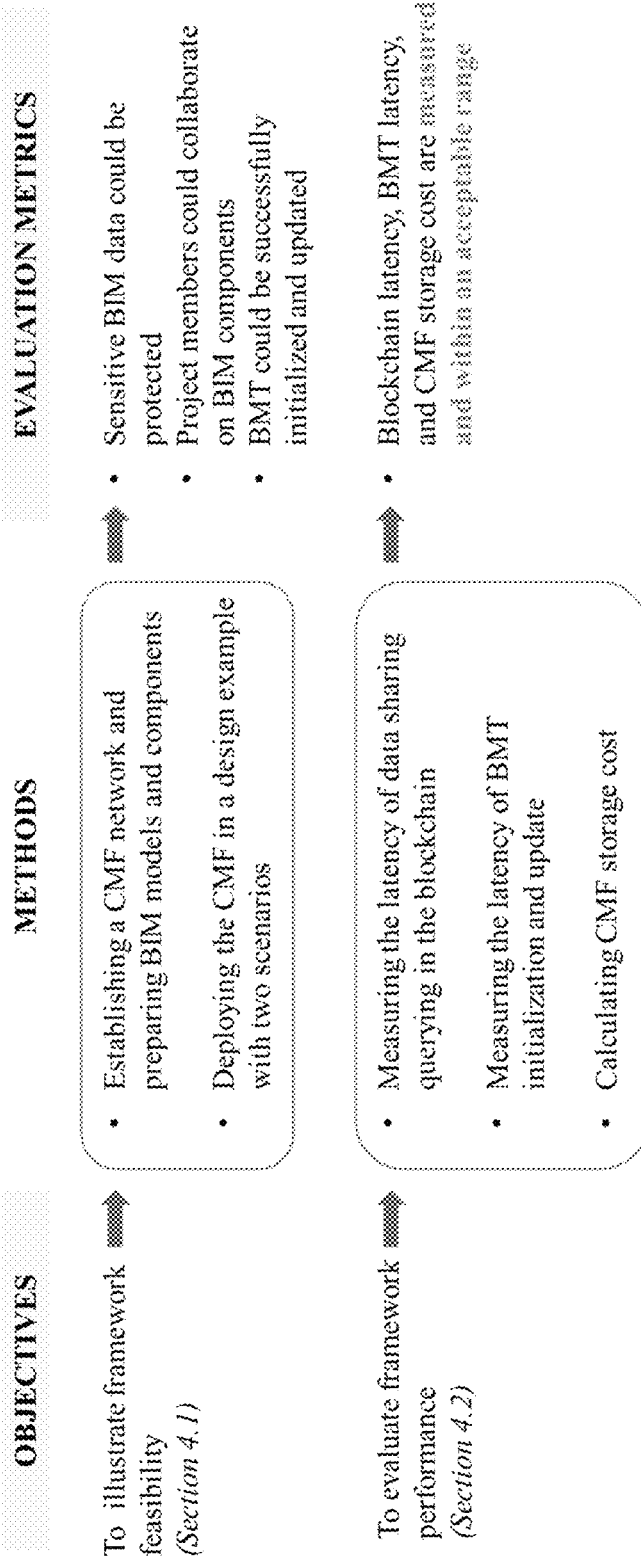
FIG. 12 depicts a schematic diagram of CMF illustration methodology.

Referring to FIG. 12. The CMF framework is applied in a design example to illustrate its feasibility and performance. FIG. 12 shows the methodology. Design teams coordinate in two scenarios to see whether the proposed framework could enable a confidentiality-minded design collaboration. Specific metrics include: (1) whether sensitive BIM data could be protected using the provided access control model, (2) whether project members could collaborate on both non-sensitive and sensitive BIM components using the workflow as presented with operations performed by the design coordination module, and (3) whether the provided BMT could be successfully initialized and updated to trace BIM data version.

The testing environment is described as follows: (1) Linux (Ubuntu 18.04) system with eight Intel® Core™ i7-10700 CPU @2.90 GHz processors, and 16 GB memory is used to develop the blockchain network. (2) Hyperledger Fabric 1.4.0 (a long-term supported version) is selected as the blockchain platform in CMF. (3) Different design teams are configured using isolated Docker containers in the blockchain. (4) The blockchain smart contract is developed using GO language (in version 1.14), and the BMT is developed using Python language (in version 2.7).

Figure 13:
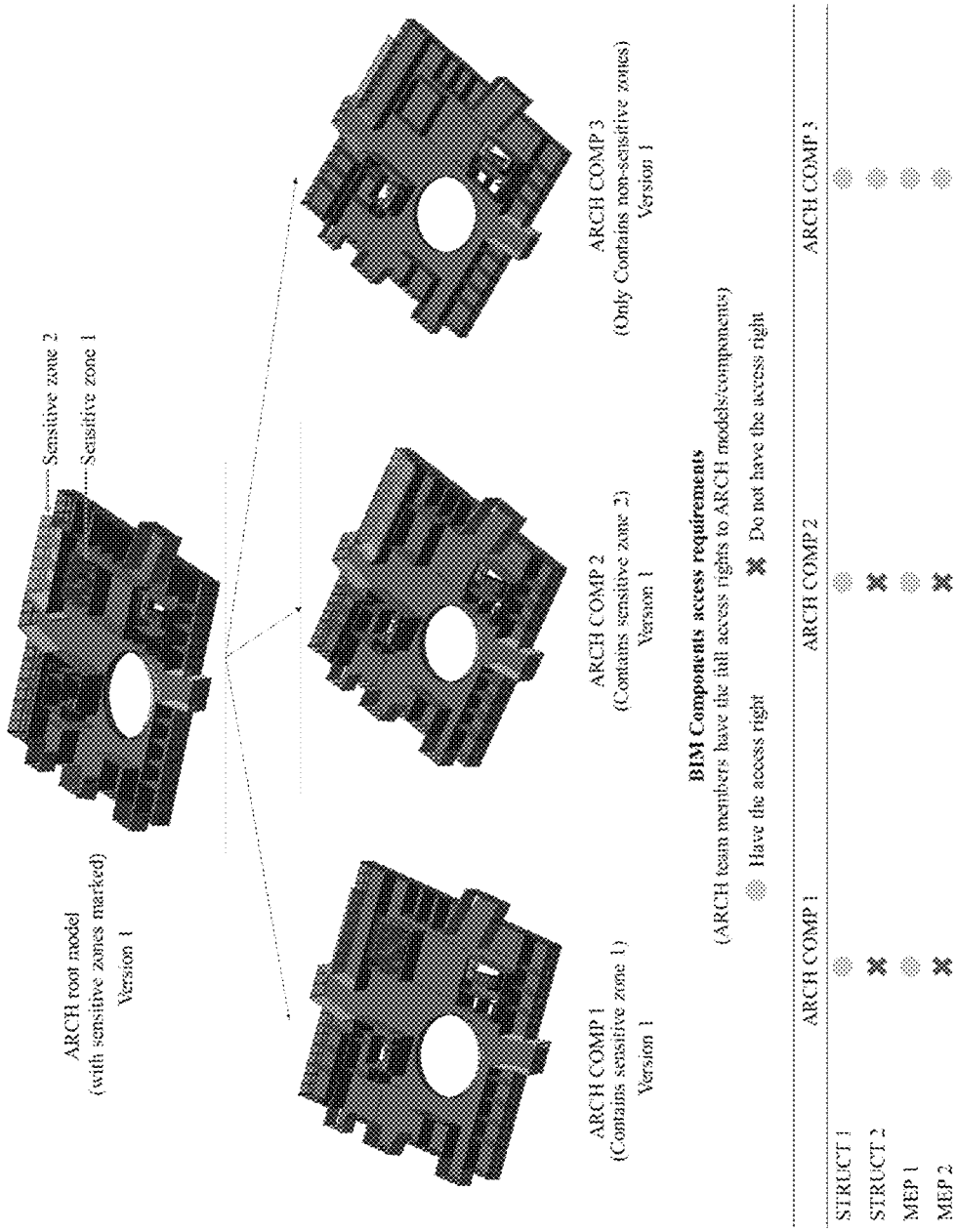
FIG. 13 depicts a schematic diagram of BIM components and access requirements in an illustrative example.

The design collaboration example uses BIM models of a university campus building, with a total floor area of 8,300 square meters. The building has six floors and eight main zones, including lecture theaters, seminar rooms, lounge zones, meeting rooms, facilities rooms, laboratories, and open spaces. Three design teams (architectural, structural, and MEP teams) are involved in the design phase to develop an architecture model, a structure model, and an MEP model, respectively. Two laboratory zones on the third floor are sensitive in this case. As shown in FIG. 13, the architecture model has been decomposed into three BIM components. Components 1 and 2 are sensitive components that remain layout of zone 1 and 2, respectively. FIG. 13 also presents the access requirements in which architectural team members have full access to ARCH models/components. STRUCT 1 and MEP 1 could access all architecture models, while STRUCT 2 and MEP 2 could only access the non-sensitive component (i.e., component 3 in this study). This project generates 500 design transactions per day, and each block contains ten transactions. This study assumes that each model would be updated 20 times per day to measure the max latency and storage cost. All models have the same decomposition results as the architecture model (i.e., one root model with three components).

Figure 14:
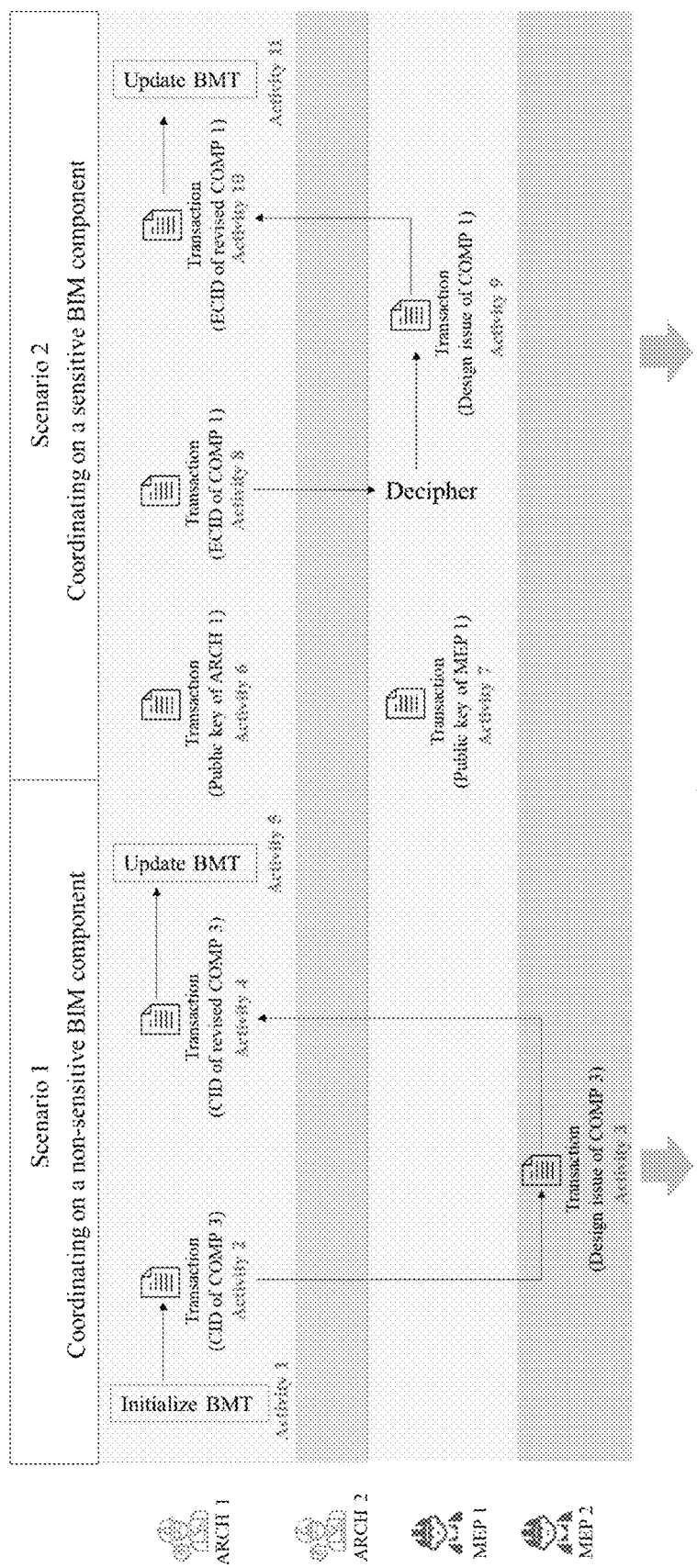
FIG. 14 depicts a schematic diagram of illustration scenarios and metrics.

Referring to FIG. 14 as the dataflow examples for scenario 1 and scenario 2.

Scenario 1: Coordinating on a non-sensitive BIM component. Project members from different domains would coordinate on component 3. Design activities such as sharing component CID, proposing design issues, and updating versions are conducted.

Figure 15:
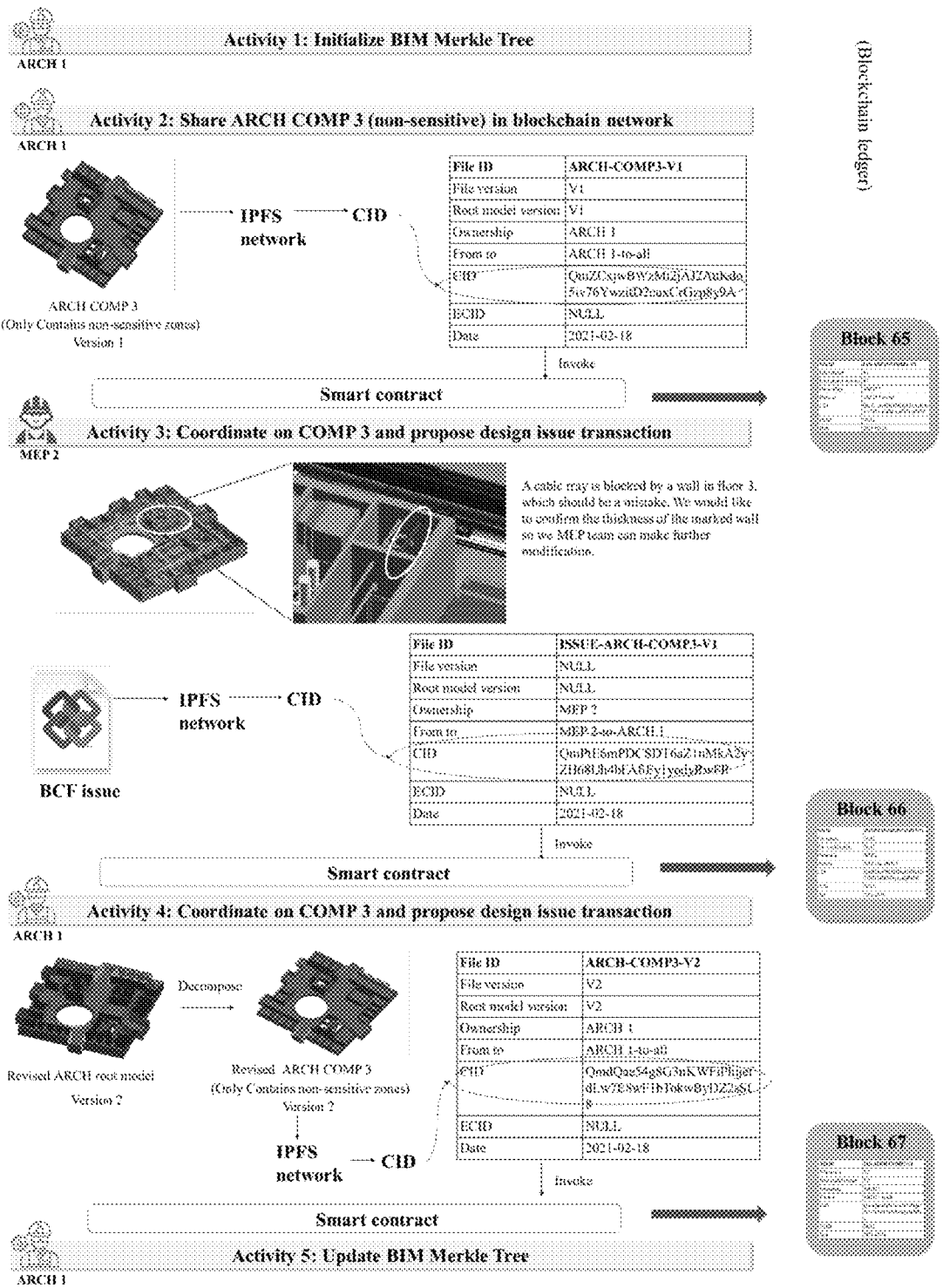
FIG. 15 depicts a process map of scenario 1.

Referring to FIG. 15, which involves five activities. In Activity 1, a BMT 1 for the architecture model is initialized with one root node and three leaf nodes. The root model and components are all in version 1. In Activity 2, ARCH 1 proposes a transaction in the blockchain to share the CID of component 3. Given this is a non-sensitive component, any members in other domains could access it. An MEP designer, MEP 2, downloads component 3 and federate it with a completed MEP BIM model for clash detection in Activity 3. A design mistake that a wall on floor three blocks the cable tray is identified. Thus, MEP 2 proposes a design issue file in BIM collaboration format (BCF) and shares it in the blockchain. ARCH 1 revises the non-sensitive zone in the root BIM model and decomposes the root model again to share the updated component 3. In Activity 4, ARCH 1 prepares a new transaction to broadcast the CID of component 3 in version 2.

Besides, in Activity 5, the architecture team updates BMT. As shown in FIG. 13, a sensitive component is composed of a non-sensitive component and partial (or all) sensitive data, and all sensitive components share common non-sensitive data (i.e., ARCH COMP 3). Thus, any modification on non-sensitive zones would lead to data change of all components. For example, if the designer tries to change a wall in the non-sensitive zone, he will modify the root model and decompose it again, referring to the "root BIM model revision" process described above. In this way, all newly decomposed components have the updated wall. Since this design alteration is valid and consistent with the rest of the data in the asset model, two follow-up actions should be taken: updating the version of all components and sharing revised BIM data. A new BMT updates all leaf nodes instead of inheriting them from the previous tree. Currently, the root architecture model and all architecture components are in version 2. Then, the sharing process follows the rules regulated in FIG. 10B. In the case of scenario 1, design change on COMP 3 does not affect sensitive zones; as a result, it could be directly shared with all members.

Scenario 2: Coordinating on a sensitive BIM component. In this scenario, project members from different domains would coordinate on a sensitive BIM component (i.e., component 1). Design activities such as encrypting component CID, sharing ECID, and proposing encrypted design issues are conducted.

Figure 16:
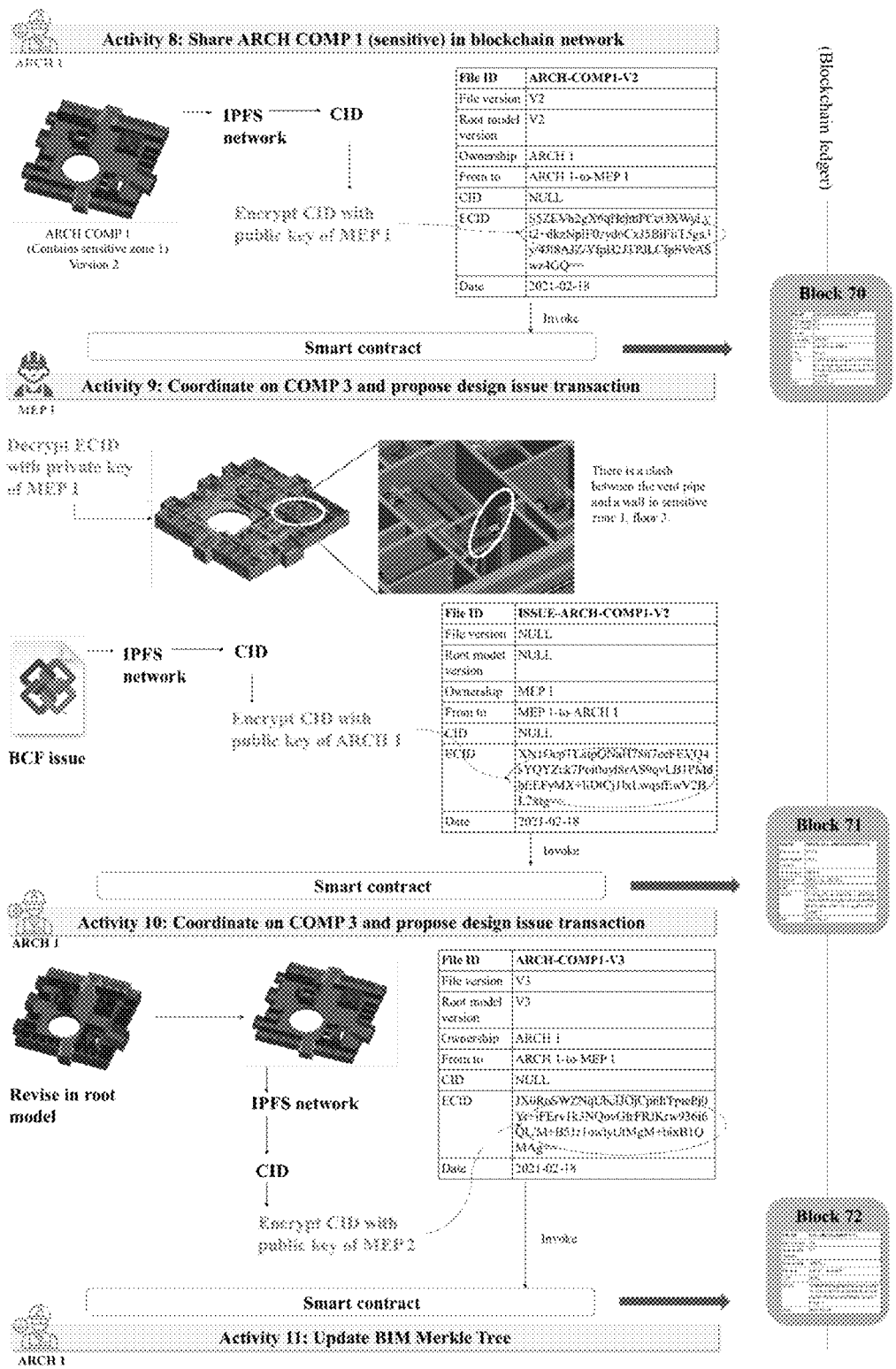
FIG. 16 depicts a process map of scenario 2.

In this scenario, two designers, ARCH 1 and MEP 1, share their public keys (Activities 6 and 7) for data encryption. FIG. 16 is the process map of scenario 2. In Activity 8, the ARCH 1 encrypts the CID of component 1 using MEP 1's public key. The ARCH 1 then shares the ECID in the blockchain network by invoking the smart contract. Although all members receive the ECID, only the authorized receivers (e.g., MEP 1) could decipher it to get the CID and download component 1 from the IPFS. In Activity 9, MEP 1 federates component 1 with the completed MEP BIM model for design coordination. A design clash in sensitive zone 1 is detected. Thus, MEP 1 proposes a design issue and encrypts the issue file CID using ARCH 1's public key. After receiving the issue file, ARCH 1 revises the sensitive zone in the root BIM model accordingly and decomposes the root model again to share the updated component 1. In Activity 10, ARCH 1 prepares a new transaction to share the ECID of component 1 in version 3. Sensitive design data in the blockchain are encrypted, preventing unauthorized access.

The functional units of the apparatuses and the methods in accordance to embodiments disclosed herein may be implemented using electronic devices, computer processors, or electronic circuitries including but not limited to application specific integrated circuits (ASIC), field programmable gate arrays (FPGA), and other programmable logic devices configured or programmed according to the teachings of the present disclosure. Machine instructions running in the electronic devices, computer processors, or programmable logic devices can readily be prepared by practitioners skilled in the software or electronic art based on the teachings of the present disclosure.

Based on above, the presented disclosure provides a confidentiality-minded framework (CMF) for blockchain-based BIM design collaboration. Three objectives have been achieved.

First, the access control model is developed. In this model, BIM models are decomposed into sensitive and non-sensitive components for data segregation. An encryption-blockchain integrated method is proposed to encrypt sensitive BIM data in a blockchain ledger to avoid unauthorized access. A smart contract supporting encryption key distribution and design information sharing in the blockchain is also developed.

Second, new strategies supporting feasible design collaboration within an access-controlled blockchain network are developed. Briefly, the strategies consist of new workflows for BIM component-based design coordination and a new BIM Merkle tree (BMT) data model for components versioning.

Thirdly, the feasibility and performance of the CMF are tested in two design scenarios, results of which show that the CMF is a promising solution for protecting sensitive data access and enabling a secure design collaboration.

Although the provided method and related examples are described to be applied to BIM data coordination, in another embodiment, the provided method can be applied to other type of data coordination, and the invention is not limited hereto.

All or portions of the methods in accordance to the embodiments may be executed in one or more electronic devices including server computers, personal computers, laptop computers, mobile computing devices such as smartphones and tablet computers.

The embodiments include computer storage media having machine instructions stored therein which can be used to configured microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implement method for performing Building Information Modelling (BIM) design collaboration via Confidentiality-Minded Framework (CMF) using Interplanetary-File-System (IPFS)-Blockchain integrated network by a server, comprising:
   segregating, by an access control module executed by a processor of the server, one or more sensitive and non-sensitive BIM portions of a BIM object;
   uploading, by a provider terminal, a target BIM component into an IPFS network;
   receiving, by the access control module, a target content identifier (CID) of the target BIM component from the IPFS network;
   determining whether the target BIM component has one or more of the sensitive portions,
      wherein if the target BIM component has one or more of the sensitive portions, encrypting, by the access control module, the target CID to obtain a target encrypted CID (ECID), and adding the target ECID into a target blockchain ledger as a target transaction via a target smart contract; else
      if the target BIM component does not have any of the sensitive portions, adding, by the access control module, the target CID into the target blockchain ledger as the target transaction via the target smart contract;
   accessing, by a reviser terminal, the target transaction to download the target BIM component from the IPFS network; and
   performing, by the reviser terminal, a design coordination operation on the target BIM component by a design coordination module, so as to distributing revised target BIM component to a receiver terminal via the access control module, the target blockchain ledger and the target smart contract.

2. The method of claim 1, wherein using the IPFS-Blockchain integrated network comprises:
   uploading, by the provider terminal, the target BIM component to the IPFS network;
   generating, by the IPFS network, the target CID based on content of the uploaded target BIM component;
   adding, by the IPFS network, the generated target CID to a target blockchain ledger as the target transaction corresponding to the uploaded BIM component;
   downloading, by the receiver terminal, the target CID from the target blockchain ledger;
   determining whether the target CID is encrypted or not;
      wherein if the target CID is encrypted, generating, by the receiver terminal, a valid target CID according to the target CID and an encryption key; else
      if the target CID is not encrypted, determining that the target CID is the valid target CID;
   sending, by the receiver terminal, the valid target CID to the IPFS network;
   downloading, by the receiver terminal, the target BIM component from the IPFS network;
   verifying, by the receiver terminal, the downloaded target BIM component by comparing the hash value of the target BIM component and the valid target CID.

3. The method of claim 2, wherein if the target BIM component has one or more of the sensitive portions, the method further comprising:
   performing, by the access control module, a BIM data segregation operation to define and separate the one or more sensitive BIM portions and the one or more non-sensitive BIM portions from the BIM object;
   performing, by the provider terminal, a BIM component registration to register a target sensitive BIM component to the access control module via a target smart contract when uploading the target sensitive BIM component to the IPFS network, wherein the target sensitive BIM component includes at least one defined sensitive BIM portions;
   generating, by the IPFS network, the target CID of the target sensitive BIM component;
   performing, by the access control module, an encryption operation on the target CID to generate target encrypted CID (ECID) according to a target public key, wherein the target public key corresponds the receiver terminal indicated by the BIM component registration;
   adding, by the access control module, the target transaction corresponding to the target ECID to the target blockchain ledger via the target smart contract;
   obtaining, by the receiver terminal, the target ECID from the target transaction of the target blockchain ledger;
   decrypting, by the receiver terminal, the target ECID via a target private key corresponding to the target public key, so as to obtain the target CID;
   downloading, by the receiver terminal, the target sensitive BIM component from the IPFS network by the decrypted target CID.

4. The method of claim 3, wherein if the target BIM component does not have any sensitive portion, the method further comprising:
   performing, by the access control module, a BIM data segregation operation to define and separate the one or more sensitive BIM portions and the one or more non-sensitive BIM portions from the BIM object;
   performing, by the provider terminal, a BIM component registration to register a target non-sensitive BIM component to the access control module when uploading the target non-sensitive BIM component to the IPFS network, wherein the target non-sensitive BIM component does not include any sensitive BIM portion defined by the BIM data segregation;
   generating, by the IPFS network, the target CID of the target non-sensitive BIM component;
   adding, by the access control module, the target transaction corresponding to the target CID to the target blockchain ledger via the target smart contract from the IPFS network;
   obtaining, by the receiver terminal, the target CID from the target transaction of the target blockchain ledger; and
   downloading, by the receiver terminal, the target non-sensitive BIM component from the IPFS network by the obtained target CID.

5. The method of claim 1, the method further comprising:
maintaining a BIM Merkle Tree (BMT) of the BIM design collaboration by the design coordination module, wherein the BMT is configured to manage the design coordination operation,
wherein the BMT comprises:
a root node; and
one or more leaf node,
wherein the root node is configured to record:
a root version number of the BMT;
one or more link hash of the leaf nodes; and
a root hash,
wherein each of the leaf nodes is configured to record:
a component number, configured to identify a corresponding BIM component;
a component version number, configured to identify a version of the corresponding BIM component;
a block number, configured to record a block index of a target block used for storing a target transaction corresponding to a CID of the corresponding BIM component; and
an updated date, configured to record a date on which the corresponding BIM component is updated.

6. The method of claim 5, wherein the method further comprising:
receiving an updated BIM component;
identifying a component number and a component version number of the received BIM component;
identifying a root version number of a root node of the BIM Merkle Tree (BMT);
identifying a target leaf node according to the component number, and one or more non-target leaf nodes of the BMT;
generating a new target leaf node of the BMT according to the component number, the component version number and the root version number;
generating a target link hash of the target leaf node;
generating a new root node of the BMT according to target link hash and the old root node; and
constructing a new BMT according to the new root node, the new target leaf node and the non-target leaf nodes.

7. A server for performing Building Information Modelling (BIM) design collaboration via confidentiality-minded Framework (CMF) using Interplanetary-File-System (IPFS)-Blockchain integrated network, comprising:
a processor, configured to execute machine instructions to implement a method comprising:
segregating, by an access control module executed by a processor of the server, one or more sensitive and non-sensitive BIM portions of a BIM object;
uploading, by a provider terminal, a target BIM component into an IPFS network;
receiving, by the access control module, a target content identifier (CID) of the target BIM component from the IPFS network;
determining whether the target BIM component has one or more of the sensitive portions,
wherein if the target BIM component has one or more of the sensitive portions, encrypting, by the access control module, the target CID to obtain a target encrypted CID (ECID), and adding the target ECID into a target blockchain ledger as a target transaction via a target smart contract; else
if the target BIM component does not have any of the sensitive portions, adding, by the access control module, the target CID into the target blockchain ledger as the target transaction via the target smart contract;
accessing, by a reviser terminal, the target transaction to download the target BIM component from the IPFS network; and
performing, by the reviser terminal, a design coordination operation on the target BIM component by a design coordination module, so as to distributing revised target BIM component to a receiver terminal via the access control module, the target blockchain ledger and the target smart contract.

8. The server of claim 7, wherein using the IPFS-Blockchain integrated network comprises:
uploading, by the provider terminal, the target BIM component to the IPFS network;
generating, by the IPFS network, the target CID based on content of the uploaded target BIM component;
adding, by the access control module, the generated target CID to a target blockchain ledger as the target transaction corresponding to the uploaded BIM component from the IPFS network;
downloading, by the receiver terminal, the target CID from the target blockchain ledger;
determining whether the target CID is encrypted or not;
wherein if the target CID is encrypted, generating, by the receiver terminal, a valid target CID according to the target CID and an encryption key; else
if the target CID is not encrypted, determining that the target CID is the valid target CID;
sending, by the receiver terminal, the valid target CID to the IPFS network;
downloading, by the receiver terminal, the target BIM component from the IPFS network;
verifying, by the receiver terminal, the downloaded target BIM component by comparing the hash value of the target BIM component and the valid target CID.

9. The server of claim 8, wherein if the target BIM component has one or more of the sensitive portions, the method further comprising:
performing, by the access control module, a BIM data segregation operation to define and separate the one or more sensitive BIM portions and the one or more non-sensitive BIM portions from the BIM object;
performing, by the provider terminal, a BIM component registration to register a target sensitive BIM component to the access control module via a target smart contract when uploading the target sensitive BIM component to the IPFS network, wherein the target sensitive BIM component includes at least one defined sensitive BIM portions;
generating, by the IPFS network, the target CID of the target sensitive BIM component;
performing, by the access control module, an encryption operation on the target CID to generate target encrypted CID (ECID) according to a target public key, wherein the target public key corresponds the receiver terminal indicated by the BIM component registration;
adding, by the access control module, the target transaction corresponding to the target ECID to the target blockchain ledger via the target smart contract;
obtaining, by the receiver terminal, the target ECID from the target transaction of the target blockchain ledger;
decrypting, by the receiver terminal, the target ECID via a target private key corresponding to the target public key, so as to obtain the target CID;

downloading, by the receiver terminal, the target sensitive BIM component from the IPFS network by the decrypted target CID.

10. The server of claim 9, wherein if the target BIM component does not have any sensitive portion, the method further comprising:
performing, by the access control module, a BIM data segregation operation to define and separate the one or more sensitive BIM portions and the one or more non-sensitive BIM portions from the BIM object;
performing, by the provider terminal, a BIM component registration to register a target non-sensitive BIM component to the access control module when uploading the target non-sensitive BIM component to the IPFS network, wherein the target non-sensitive BIM component does not include any sensitive BIM portion defined by the BIM data segregation;
generating, by the IPFS network, the target CID of the target non-sensitive BIM component;
adding, by the access control module, the target transaction corresponding to the target CID to the target blockchain ledger via the target smart contract;
obtaining, by the receiver terminal, the target CID from the target transaction of the target blockchain ledger; and
downloading, by the receiver terminal, the target non-sensitive BIM component from the IPFS network by the obtained target CID.

11. The server of claim 7, the method further comprising:
maintaining a BIM Merkle Tree (BMT) of the BIM design collaboration by the design coordination module, wherein the BMT is configured to manage the design coordination operation,
wherein the BMT comprises:
a root node; and
one or more leaf node,
wherein the root node is configured to record:
a root version number of the BMT;
one or more link hash of the leaf nodes; and
a root hash,
wherein each of the leaf nodes is configured to record:
a component number, configured to identify a corresponding BIM component;
a component version number, configured to identify a version of the corresponding BIM component;
a block number, configured to record a block index of a target block used for storing a target transaction corresponding to a CID of the corresponding BIM component; and
an updated date, configured to record a date on which the corresponding BIM component is updated.

12. The server of claim 11, wherein the method further comprising:
receiving an updated BIM component;
identifying a component number and a component version number of the received BIM component;
identifying a root version number of a root node of the BIM Merkle Tree (BMT);
identifying a target leaf node according to the component number, and one or more non-target leaf nodes of the BMT;
generating a new target leaf node of the BMT according to the component number, the component version number and the root version number;
generating a target link hash of the target leaf node;
generating a new root node of the BMT according to target link hash and the old root node; and
constructing a new BMT according to the new root node, the new target leaf node and the non-target leaf nodes.

* * * * *